US010007860B1

(12) United States Patent
Fotland et al.

(10) Patent No.: US 10,007,860 B1
(45) Date of Patent: Jun. 26, 2018

(54) IDENTIFYING ITEMS IN IMAGES USING REGIONS-OF-INTEREST

(71) Applicant: Amazon Technologies, Inc., Seattle, WA (US)

(72) Inventors: David Allen Fotland, San Jose, CA (US); Ambrish Tyagi, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/976,696

(22) Filed: Dec. 21, 2015

(51) Int. Cl.
| | |
|---|---|
| G06K 9/00 | (2006.01) |
| G06K 9/32 | (2006.01) |
| G06K 9/62 | (2006.01) |
| G06T 7/00 | (2017.01) |
| G06K 9/46 | (2006.01) |

(52) U.S. Cl.
CPC ....... *G06K 9/3233* (2013.01); *G06K 9/00369* (2013.01); *G06K 9/4671* (2013.01); *G06K 9/6256* (2013.01); *G06T 7/0081* (2013.01); *G06T 2207/20132* (2013.01); *G06T 2207/20141* (2013.01); *G06T 2207/20144* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,253,766 | B2 * | 8/2007 | Foote | .................... G01S 13/003 342/179 |
| 7,386,150 | B2 * | 6/2008 | Fleisher | .................. G01S 13/89 342/22 |
| 8,397,314 | B2 * | 3/2013 | Burke | ...................... A41B 9/00 2/238 |
| 8,956,031 | B2 * | 2/2015 | Silberman | ............. B43K 29/08 362/551 |
| 8,976,160 | B2 * | 3/2015 | Vilcovsky | .............. G06F 3/017 345/204 |
| 9,189,886 | B2 * | 11/2015 | Black | ................. G06K 9/00369 |
| 9,269,157 | B2 * | 2/2016 | Saban | ..................... G02B 5/08 |

(Continued)

OTHER PUBLICATIONS

Notice of Allowance for U.S. Appl. No. 14/976,850, dated Dec. 21, 2017, Tyagi, "Identifying Items in Images Using Regions-of-Interest", 16 pages.

(Continued)

*Primary Examiner* — Anand Bhatnagar
(74) *Attorney, Agent, or Firm* — Lee & Hayes, PLLC

(57) ABSTRACT

The techniques described herein may identify images that likely depict one or more items by comparing features of the items to features of different regions-of-interest (ROIs) of the images. For instance, some of the images may include a user, and the techniques may define multiple regions within the image corresponding to different portions of the user. The techniques may then use a trained convolutional neural network or any other type of trained classifier to determine, for each region of the image, whether the region depicts a particular item. If so, the techniques may designate the corresponding image as depicting the item and may output an indication that the image depicts the item. The techniques may perform this process for multiple images, outputting an indication of each image deemed to depict the particular item.

20 Claims, 27 Drawing Sheets

(56) References Cited

U.S. PATENT DOCUMENTS

| | | | |
|---|---|---|---|
| 9,355,406 B2* | 5/2016 | Rosen | G06K 9/00362 |
| 9,542,626 B2* | 1/2017 | Martinson | G06K 9/6256 |
| 2006/0244757 A1 | 11/2006 | Fang | |
| 2007/0273711 A1* | 11/2007 | Maffei | G06T 13/40 |
| | | | 345/630 |
| 2008/0144885 A1* | 6/2008 | Zucherman | G06K 9/3241 |
| | | | 382/103 |
| 2010/0111370 A1* | 5/2010 | Black | G06K 9/00369 |
| | | | 382/111 |
| 2010/0177234 A1 | 7/2010 | Ogura et al. | |
| 2010/0296697 A1 | 11/2010 | Ikenoue | |
| 2012/0287122 A1 | 11/2012 | Nadar et al. | |
| 2013/0215116 A1 | 8/2013 | Siddique et al. | |
| 2013/0343642 A1* | 12/2013 | Kuo | G06K 9/4652 |
| | | | 382/159 |
| 2014/0114192 A1 | 4/2014 | Yin | |
| 2016/0092739 A1 | 3/2016 | Oami et al. | |
| 2016/0092746 A1 | 3/2016 | Asvatha Narayanan et al. | |
| 2016/0180195 A1* | 6/2016 | Martinson | G06K 9/6256 |
| | | | 382/103 |
| 2016/0210602 A1 | 7/2016 | Siddique et al. | |
| 2016/0219265 A1 | 7/2016 | Adeyoola et al. | |
| 2016/0275665 A1* | 9/2016 | Rosen | G06K 9/00362 |
| 2016/0350833 A1 | 12/2016 | Andon | |
| 2017/0169313 A1 | 6/2017 | Choi et al. | |

OTHER PUBLICATIONS

Office action for U.S. Appl. No. 14/976,696, dated Mar. 9, 2017, Fotland, "Identifying Items in Images Using Regions-of-Interest", 16 pages.

Office action for U.S. Appl. No. 14/976,850, dated Jul. 3, 2017, Tyagi, "Identifying Items in Images Using Regions-of-Interest", 20 pages.

* cited by examiner

IDENTIFYING ITEMS IN IMAGES USING REGIONS-OF-INTEREST

BACKGROUND

Electronic devices are ubiquitous in today's society. People use tablet computing devices, mobile phones, electronic book readers, laptop computers, and the like for an array of recreational and/or work-related activities. For instance, users often use electronic devices to capture images and videos of users and other scenes.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 11 and 12 illustrate that the ROI size may change based on the item being searched for (e.g., a T-shirt versus jeans).

DETAILED DESCRIPTION

Figure 1:
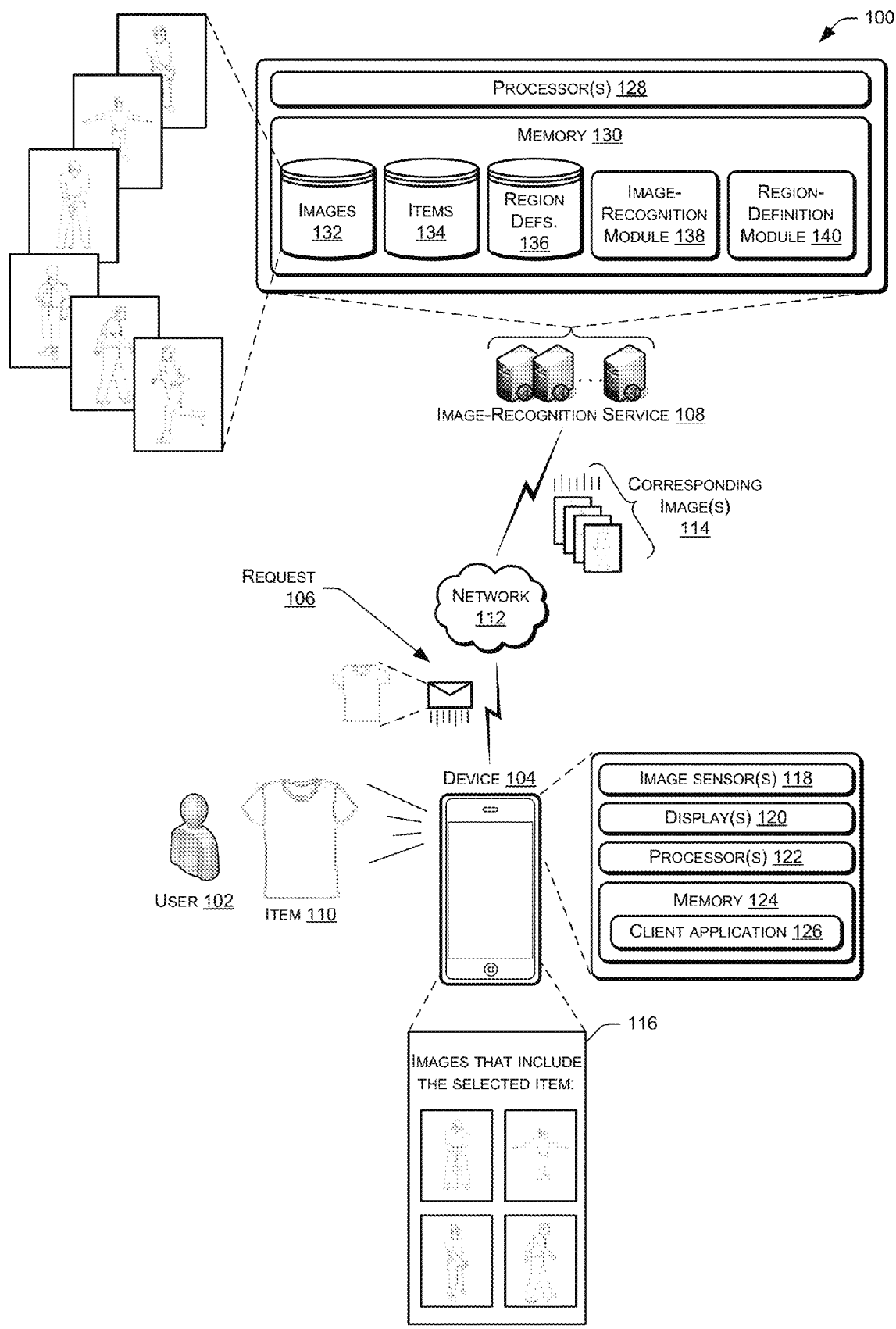
FIG. 1 illustrates an example environment that includes a user requesting that an image-recognition service identify previously captured images that depict a particular item, in this case a particular T-shirt. In response to receiving this request, the image-recognition service compares features of the T-shirt to features of several different regions-of-interest (ROIs) of the previously captured images and sends an indication of those images that depict the T-shirt.

This application describes techniques for identifying images that likely depict one or more items by comparing features of the items to features of different regions-of-interest ("ROIs" or simply "regions") of the images. For instance, some of the images may include a user (i.e., a person), and the techniques may define multiple regions within the image corresponding to different portions of the user. The techniques may then use a trained convolutional neural network, a Siamese network, or any other type of trained classifier to determine, for each region of the image, whether the region depicts a particular item. That is, the techniques may determine whether a similarity between features of the region and features of the particular item is greater than a threshold similarity. If so, the techniques may designate the corresponding image as depicting the item and may output an indication that the image depicts the item. The techniques may perform this process for multiple images, outputting an indication of each image deemed to depict the particular item, a number of "N" images having the highest similarity to the particular item, the first number of "N" images having been deemed to depict the item, and/or the like.

In one example, the particular item compared to the regions of the images comprises an item of clothing. For instance, a user may capture images of some or all items of clothing in a closet of the user using a camera of an electronic device, with each image corresponding to a single clothing item. The device may store the images, or the device may upload these images to a remote service that stores an indication of these items in association with a user account of the user at the service. In the alternative to taking pictures of each clothing item in the closet of the user, the user may indicate her clothing items in other ways, such as selecting the items from a website or client application maintained by the remote service or a third-party.

In either instance, in addition to indicating clothing items owned by or otherwise associated with the user, the user may also capture images of the user or other users. In one example, the user may capture an image each morning after dressing herself, such that the user may later reference the outfit worn by the user that particular day. The device that captures these images may store the images locally and/or may upload these images to the remote service. As the reader will appreciate, over time these images will depict the user wearing a variety of combinations of clothing items from the user's closet, such as blouses, shirts, jackets, pants, shorts, belts, shoes, socks, stocking, sandals, hats, necklaces, bracelets, other jewelry, ties, or the like. These images may also illustrate other items other than clothing, such as a hairstyle of the user, her makeup, or the like.

After the user indicates the items in her closet and after the device captures images of the user wearing these items, the user may later wish to see images of the user wearing a particular item (e.g., a clothing item, a hairstyle, etc.). For instance, the user may wonder, for a particular blouse, "What have I worn with this blouse in the past?" or "What have I worn when I have this hairstyle?" In the first example, she may wish to view images of her wearing the blouse in order to determine which pants she likes best with the blouse, to make sure she doesn't repeat an outfit, and/or for any other reason. As such, the user may request, via her client device, to view images of her wearing the particular blouse. In one example, she may make this request by holding the blouse up to a camera of the device such that the device captures an image of the device and recognizes the item (or provides the image to the remote service for recognition) along with a command (e.g., a voice command, a manually input command, etc.) to display images of the user wearing the item. In another example, the device of the user executes a client application that allows the user to select the blouse from a graphical user interface (GUI) to view images that include the user wearing the item.

In response to receiving the request, the device or the remote service may attempt to identify those images that depict the user wearing the selected blouse. Or, the device or the remote service may have previously performed this matching process. In either instance, to determine images that depict the particular item, the device or the remote service may define regions within each image for which the device or the service will analyze to determine whether the image depicts the item. In some instances, a first region substantially corresponds to pixel data that represents a fully body of the user in the image, a second region substantially corresponds to pixel data that represents a torso of the user (i.e., without legs/bottom half of the user) in the image, and a third region substantially corresponds to pixel data that represents legs or a bottom half of the user (i.e., no torso) in the image. Further, a fourth region may substantially correspond to pixel data that represents a center of the torso of the user—to capture a shirt that may be covered by an unzipped jacket or sweater, for instance—while a fifth region may substantially correspond to pixel data that represents the arms and torso of the user less the center portion—to capture the unzipped jacket or sweatshirt without the underlying shirt, for instance.

The device or the remote service may then compare features of the selected blouse to features of each of these regions. That is, the device or the service may compare features such as color, pattern, hue, material, etc. to determine whether the respective region likely depicts the blouse. To make this comparison, the device or the remote service may utilize a trained neural network, a trained classifier, or any other known technique for determining whether an image (in this case a region of an image) includes a particular item, such as the example blouse. In some instances, the device or the service first compares a color histogram associated with the selected blouse to a color histogram associated with each region and may determine that the regions that match within a threshold color similarity should be analyzed further. The device or service may then utilize the trained classifier to determine whether features of each region is sufficiently similar to features of the selected blouse so as to mark the region and corresponding image as depicting the item. In other words, the device or the service may filter out the regions that do not match the item from a color standpoint and may then use a trained classifier on the remaining regions.

After identifying one or more images that are deemed to depict the item, the device or the remote service may output an indication of these images. For instance, the device may display ten images of the user wearing the particular blouse. These images may each be displayed with a time and/or date at which the image was captured. The user may browse these images to view the outfits she has worn with the particular blouse, and may thus make a more educated decision about what to wear with that blouse that day (or whether to wear the blouse at all). Further, and as stated above, in some instances the techniques may perform the matching process on the user's daily uploaded images prior to receiving a request from the user to identify a particular item. For instance, the techniques may use a trained classifier for a first item (e.g., a first particular blouse) to determine whether an uploaded images contains the first item, may use a trained classifier for a second item (e.g., a second particular blouse) to determine whether the uploaded image contains the second item, and the like. The techniques may then store an indication of which one or more items the uploaded image contains. Therefore, when a user later requests to view images that depict a particular item (e.g., the second blouse), the techniques may identify those images determined to depict that item and may surface these images to the user.

Of course, while the above example describes the user uploading images of herself and then searching these images to identify ones that include a particular item, in other instances one or more other types of images may be searched. For example, the device or the remote service may search the Web (or predefined websites) for images of people wearing the particular blouse and may output an indication of these images, in addition to or in the alternative from the images of the user. Furthermore, the device or the service may search images to identify items that are similar to but different from the selected blouse. Further, the device or the remote service may output, in addition to or instead of the images, links to items that are often associated with the particular item (e.g., often worn with the particular blouse) to allow the user to purchase or otherwise obtain these related items. For example, the service may display an indication that a particular skirt is often worn with that blouse, and may include a link that is selectable by the user to learn more about the skirt and/or purchase the skirt.

In some instances, the techniques described herein calculate a size of a region and/or regions in which to search based on the item being searched for. For instance, when a user requests to identify images that depict a particular T-shirt, the techniques may search for the T-shirt within regions of images with the size of these regions being based on the size of the T-shirt. Conversely, if the user requests to search for images that depict jeans or pants, the techniques may search regions of the images with the size of these regions corresponding to the size of the jeans or pants.

In these instances, the techniques may also take into account image depth information when calculating these region sizes. That is, if a user within an image is far away, then the size of the regions may be smaller (given that the T-shirt would be smaller in the image) than if the user were relatively close within the image. Stated otherwise, because an item may appear smaller within an image when its depth is greater, the region-of-interest (ROI) size being searched may be increasingly smaller as the depth of the object increases.

In certain instances described below, a user may provide a reference image of an item and request to view images that also include the item. Here, the techniques may determine, via a depth map, a depth of the object within the reference image. In addition, the techniques may determine a depth of a user within each of multiple images. Then, the techniques may determine, for each individual image being searched, an ROI size on which to search based on the size of the item (e.g., the T-shirt), the depth of the object within the reference image, and the depth of the user within the image. As such, a different ROI size may be calculated and used for each image being searched in some instances. In one example, the ROI size is calculated as a function of a product of the size of the object in the referenced image ($S_{RI}$) and a ratio of the depth of the object within the reference image ($D_{RI}$) to the depth of the user in the image being searched ($D_1$), as follows:

$$\text{ROI size} = S_{RI} \times (D_{RI}/D_1) \quad (1)$$

In some instances, the size of the object in the referenced image ($S_{RI}$) corresponds to a number of pixels within a box or other shape that encapsulates the object (e.g., a 400 pixel box) or $S_{RI}$ corresponds to a number of pixels of one dimension or side of a square or rectangle that encapsulates the object (e.g., 20 pixels, in the case of a 400 pixel square that encapsulates the object).

After calculating an ROI size for a particular image to be searched, the techniques may search one or more regions in the image, with the regions having the corresponding ROI size. For instance, the techniques may define regions within the image to be searched, with the searched regions collectively accounting for each pixel space within an image or within a particular bounding box. In some instances, each region to be searched overlaps within at least one adjacent region. Similar to the above, searching each region for the item may include first calculating a color histogram for the item (e.g., the T-shirt) and a color histogram for each region to be searched. The techniques may then determine, for each region, whether a color similarity between the color histogram of the region and the color histogram of the item is within a threshold color similarity. If not, then the techniques may move on to check another region. If the color similarity is greater than the color similarity threshold, however, then the techniques may compare features of the item to features of the region to using a trained classifier determine whether a feature similarity is greater than a feature-similarity threshold. If so, then the techniques may store an indication that the region does in fact depict the item. If not, then the techniques may store an indication that the region does not depict the item and/or may move on to check another region.

While the above example describes locating a particular item of clothing in one or more regions of images, it is to be appreciated that the described techniques may apply to identifying any other type of item within an image. For instance, the item may correspond to any type of physical item (e.g., soccer ball, baseball mitt, etc.), characteristic of a user (e.g., hairstyle, smile, posture, etc.), characteristic of the image (e.g., blurry, sunny, washed out, etc.), or the like.

FIG. 1 illustrates an example environment 100 that includes a user 102 operating a client device 104 to send a request 106 that an image-recognition service 108 identify previously captured images that depict a particular item 110, in this case a particular T-shirt. In response to receiving this request 106, the image-recognition service compares features of the T-shirt to features of several different ROIs of the previously captured images and sends, over a network 112, an indication of those images 114 that depict the T-shirt. In this example, the device 104 display a GUI 116 illustrating those images that the remote service 108 has designated as depicting the particular item 110.

As discussed above, to select the item 110, the user 102 may select an indication (e.g., an icon) of the item 110 from a client application executing on the client device 104. In another example, the user 102 may hold the physical item 110 in front of a camera of the device 104, which may capture an image of the item 110. The device 104 may then provide the image of the item 110 to the remote service 108, which may either compare features of the image of the item 110 directly to the different regions of the previously captured images, or may first identify the item 110 from the image and then identify pre-stored features associated with the item 110 for comparing to the regions of the images.

As illustrated, the client device 104 may include one or more image sensors 118 (e.g., still cameras, video cameras, etc.), one or more displays 120 (and/or other output components), one or more processors 122, and memory 124. The memory 124 may store a client application 126, which the user 102 may use for implementing some or all of the techniques described herein. For instance, the user may use the client application 126 and the image sensors 118 to capture items associated with the user, such as clothing items of the user. The device 104 may then store these images locally or may upload the images to the image-recognition service 108. The user 102 may also use the client application 126 to request to view images that depict a particular item, such as the example T-shirt. In addition, the client application 126 may display the GUI 116 illustrating the images that depict the selected item, such as the shirt.

As illustrated, the device 104 may couple to the image-recognition service 108 over the network 112. The network 112 may be representative of any type of communication network, including data and/or voice networks, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. Also as illustrated, the image-recognition service 108 may be implemented as one or more servers that, in some instances, form a portion of a network-accessible computing platform implemented as a computing infrastructure of processors 128 and storage (e.g., memory 130) that is accessible via the network 112, such as the Internet. The image-recognition service 108 may not require end-user knowledge of the physical location and configuration of the system that delivers the services. Common expressions associated for the resources of the image-recognition service 108 may include "on-demand computing", "software as a service (SaaS)", "platform computing", "network-accessible platform", "cloud services", "data centers", and so forth.

As illustrated, the memory 130 may store a datastore of one or more images 132, a datastore of one or more items 134, a datastore of one or more region definitions 136, an image-recognition module 138, and a region-definition module 140. The datastore 132 may store images captured by one or more users, such as the example user 102. For instance, the user 102 may capture images using the client device 104, which may upload these images to the image-recognition service 108 for storage. In some instances, each image is associated with a particular user or user account, such that the images of a particular user are later searchable in response to receiving a request from the corresponding user. For instance, the image-recognition service 108 may search regions of these images in response to subsequent requests received from users, such as the example request 106 received from the user 102. In addition or in the alternative, the image-recognition service 108 may search images other than those uploaded by a particular user. For instance, users may consent to sharing their images such that these images are searchable in response to requests from other users. Or, the image-recognition service 108 may search images from the Internet or from other corpuses of information.

The datastore 134, meanwhile, may store items associated with users, such as the user 102. For instance, the user 102 may capture images using the device 104 of one or more items of the user, such as each clothing item in the user's closet (or multiple clothing items from the user's closet). Additionally or alternatively, the image-recognition service 108 may store indications of items purchased or otherwise obtained by the user. For instance, if the user 102 purchases a particular item from a merchant (e.g., from the image-recognition service 108 in some instances), the image-recognition service 108 may store an indication that the user 102 purchased the particular item. By storing indications of these items associated with the user 102, the user 102 is able to select one or more of her items (or multiple ones) to request to view images that depict the item (or the multiple items).

The region-definition module 140, meanwhile, functions to define regions (i.e., ROIs) within the images 132, with these regions corresponding to a two-dimensional subset of pixels of an image (e.g., a rectangular 20 pixel by 10 pixel area of an image, or the like). In some instances, the region-definition module 140 utilizes one or more algorithms for defining multiple regions within each of the images 132, with each region comprising less than all of the respective image. In some instances, the region-definition module 140 defines the regions with respect to a user within each respective image. For instance, one region may correspond to a fully body of a user in the image (or as much of the body that is present in the image), another region may correspond to a torso of the user (or as much as is present), and yet another region may correspond to legs or a bottom half of the user (or as much is as present). In still other instances, a region may correspond to a center portion of the torso of the user in the image, and another region may correspond to arms of the user and a torso of the user less then center portion. Of course, while a few example regions are described, it is to be appreciated that these regions are merely illustrative and that many other different regions may be utilized. Further, in some instances, the region-definition module 140 may define the regions using the techniques discussed below with reference to FIGS. 3A-7 and 10A-10C.

In addition or in the alternative, the region-definition module 140 may define the regions using the techniques described below with respect to FIGS. 11A-D, 12A-D, and 13. Here, the module 140 calculates a size of regions in which to search based on the item being searched for. For instance, when a user requests to identify images that depict a particular T-shirt, the module 140 may define regions to search for the T-shirt having a size that is based on the size of the T-shirt. Conversely, if the user requests to search for images that depict jeans or pants, the module 140 may define regions in which to search having a size that is based on the size of the jeans or pants.

In these instances, the module 140 may also take into account image depth information when calculating these region sizes. That is, if a user within an image is far away, then the size of the regions may be smaller (given that the T-shirt would be smaller in the image) than if the user were relatively close within the image. Stated otherwise, because an item may appear smaller within an image when its depth is greater, the region-of-interest (ROI) size being searched may be increasingly smaller as the depth of the object increases.

In certain instances described below, a user may provide a reference image of an item and request to view images that also include the item. Here, the module 140 may determine, via a depth map, a depth of the object within the reference image. In addition, the module 140 may determine a depth of a user within each of multiple images. Then, the module 140 may determine, for each individual image being searched, an ROI size on which to search based on the size of the item (e.g., the T-shirt), the depth of the object within the reference image, and the depth of the user within the image. As such, a different ROI size may be calculated and used for each image being searched in some instances. In one example, the ROI size is calculated as a function of a product of the size of the object in the referenced image ($S_{RI}$) and a ratio of the depth of the object within the reference image ($D_{RI}$) to the depth of the user in the image being searched ($D_1$), as follows and as previously reproduced above:

$$\text{ROI size} = S_{RI} \times (D_{RI}/D_1) \quad (1)$$

To determine the size of the object, $S_{RI}$, the module 140 identifies the pixels within the image corresponding to the object and stores an indication of the number of these pixels. In some instances, the module 140 may define a rectangular box that most tightly bounds all or substantially all of the pixels corresponding to the object and designates this box as the size of the object. After calculating an ROI size for a particular image to be searched using Equation (1), the module 140 may define regions within the image to be searched, with the searched regions collectively accounting for each pixel space within an image or within a particular bounding box. In some instances, each region to be searched overlaps within at least one adjacent region. Similar to the above, searching each region for the item may include first calculating a color histogram for the item (e.g., the T-shirt) and a color histogram for each region to be searched. The techniques may include determining, for each region, whether a color similarity between the color histogram of the region and the color histogram of the item is within a threshold color similarity. If not, then the techniques may move on to check another region. If the value associated with the color histogram for the item and the value associated with the color histogram for the region is exceeds the color similarity threshold, however, then the techniques may include compare features of the item to features of the region to using a trained classifier determine whether a feature similarity is greater than a feature-similarity threshold. If so, then the techniques may store an indication that the region does in fact depict the item. If not, then the techniques may store an indication that the region does not depict the item and/or may move on to check another region.

After the region-definition module 140 defines the regions, the module 140 may store the definition of these regions in the datastore 136. In some instances, these definitions may comprise coordinates to be associated with each image. For instance, the datastore 136 may store, for each of multiple images, an indication that the first region of the respective image corresponds to a first set of coordinates of the image, the second region of the respective image corresponds to second set of coordinates of the image, and so forth. In other instances, portions of the images corresponding to the regions themselves may be stored in the datastore 136. In some instances, these regions comprise rectangular shapes (defined by X-Y pixel coordinates), while in other instances these regions comprise any other type of regular or irregular shape.

The image-recognition module 140, meanwhile, may utilize a trained neural network, classifier, or other tool to determine whether a region of an image depicts a particular item, as discussed above. For instance, in response to the user 102 providing the request 106 to identify images that contain the item 110, the image-recognition module 140 may compare features of the item 110 to features of a first region of a first image, a second region of the first image, and so forth to determine whether one or more regions of the first image are sufficiently similar to the item 110 to designate the region as depicting the item. In some instances, if a single region of an image has a similarity to a particular item that is greater than a threshold, then the corresponding image may be deemed to depict the particular item. In other instances, if multiple regions of the image have respective similarities to the item then the image may be deemed to depict the item. Further, after comparing regions of the first image to the item, the image-recognition module 138 may proceed to do the same for a second image, a third image, and so forth. The image-recognition module 138 may output an indication of one or more images that depict the particular item. For instance, the module 138 may send, to the device, data for displaying the GUI 116. The indication may comprise any other type of visual or audible data in other instances. In some instances, the image recognition module 138 may perform the comparing processes discussed with reference to FIGS. 7-8 and 13.

Further, while FIG. 1 illustrates certain operations being performed at the image-recognition service 108, in other instances these operations may be performed at the device 104 and/or another entity. For instance, the client application 126 may store and execute the region-definition module 140 and/or the image-recognition module 138.

Figure 2:
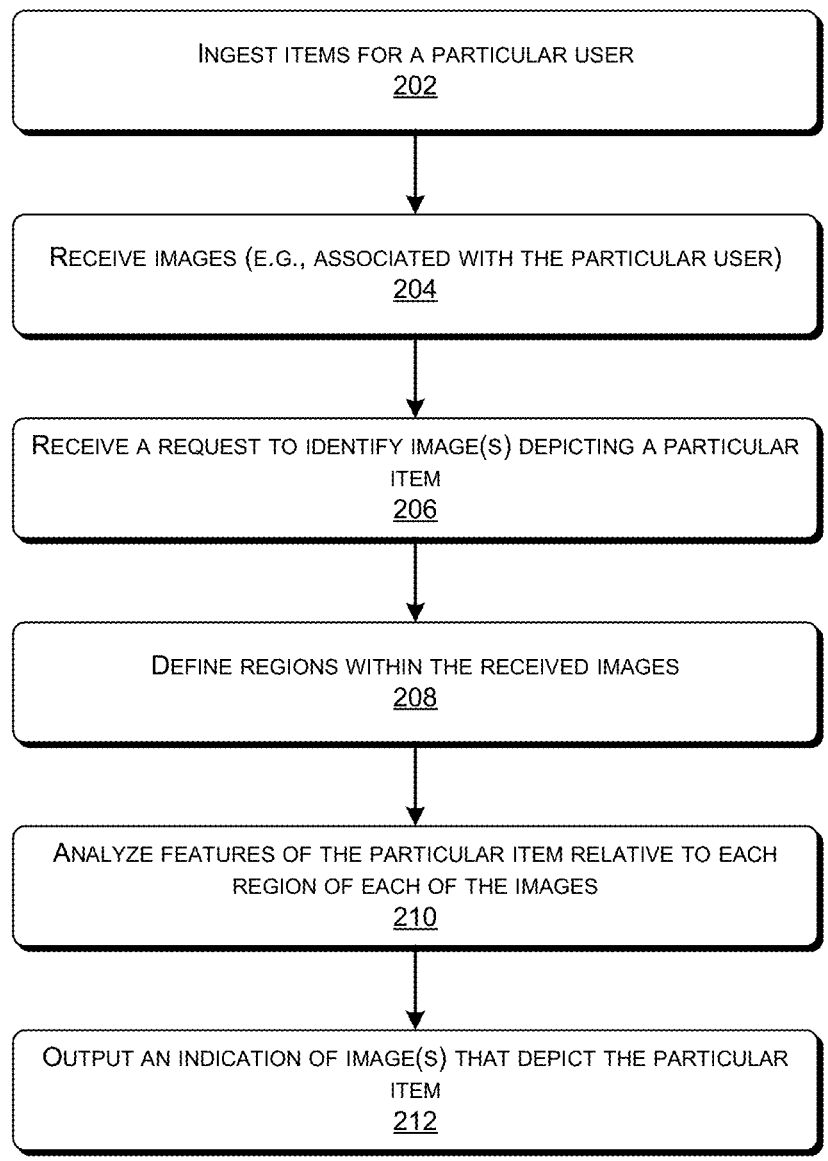
FIG. 2 illustrates an example process that includes ingesting a collection of items, receiving images that may depict one or more of the items, receiving a request to identify images that depict a particular one of the items, and analyzing features of the particular item relative to features of different ROIs of the images to identify images that depict the particular item.

FIG. 2 illustrates an example process 200 that includes ingesting a collection of items, receiving images that may depict one or more of the items, receiving a request to identify images that depict a particular one of the items, and analyzing features of the particular item relative to features of different ROIs of the images to identify images that depict the particular item. The process 200 may be performed by the client device 104, the image-recognition service 108, or a combination thereof. Further, each process described herein is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The process 200 may be performed, in some instances, by the region-definition module 140 and/or the image-recognition module 138 described above.

At 202, the process 200 ingests items for a particular user. For instance, a user may upload, to the image-recognition service 108 and via a device of the user, images corresponding to multiple clothing items of the user. The image-recognition service 108 may store an indication of these items in association with an account of the user at the image-recognition service 108.

At 204, the process receives image data corresponding to one or more images, some or all of which may be associated with the particular user and some or all of which may depict one or more of the ingested items. For instance, the user may upload, to the image-recognition service 108 and via a device of the user, image data corresponding to images of the user each day before she leaves for work, thus creating a record of the outfits worn by the user. In other instances, the received image data correspond to images of other users, captured by the particular user or otherwise. These other images may be uploaded by the other users, found on the Internet, or the like.

At 206, the process 200 receives a request to identify one or more images depicting a particular item. In some instances, the user operates the client application 126 discussed above to select a particular item, such as a particular clothing item that the user has previously indicated as being associated with the user. In other instances, the user may capture an image of an item using a device of the user and the device may upload the image to the image-recognition service 108, which in turn recognizes the item and the request to identify images containing the item.

At 208, the process 200 defines regions within the image data received at 204. In some instances, the region-definition module 140 defines these regions prior to receiving the request at 206, while in other instances this may occur after. In either instance, the region-definition module 140 may define regions for the image data corresponding to each of the multiple received images.

At 210, the process 200 analyzes features of the particular relative to features of the regions of the images. For instance, the image-recognition module 138 may implement a trained convolutional neural network or other trained classifier to determine whether a similarity between features of the particular item and features of a particular region of an image is greater than a similarity threshold. If so, then the corresponding image may be designated as depicting the particular item.

At 212, the process 200 outputs an indication of those images that are deemed to depict the particular item. For instance, the image-recognition module 138 may send the matching images or indications of the matching images to the device of the user. In some instances, this includes sending each matching image, the top "N" number of matching images having a highest similarity score, the first "N" images deemed to include the item, the first "N" matching images that were captured most recently, or the like.

Figure 3A:
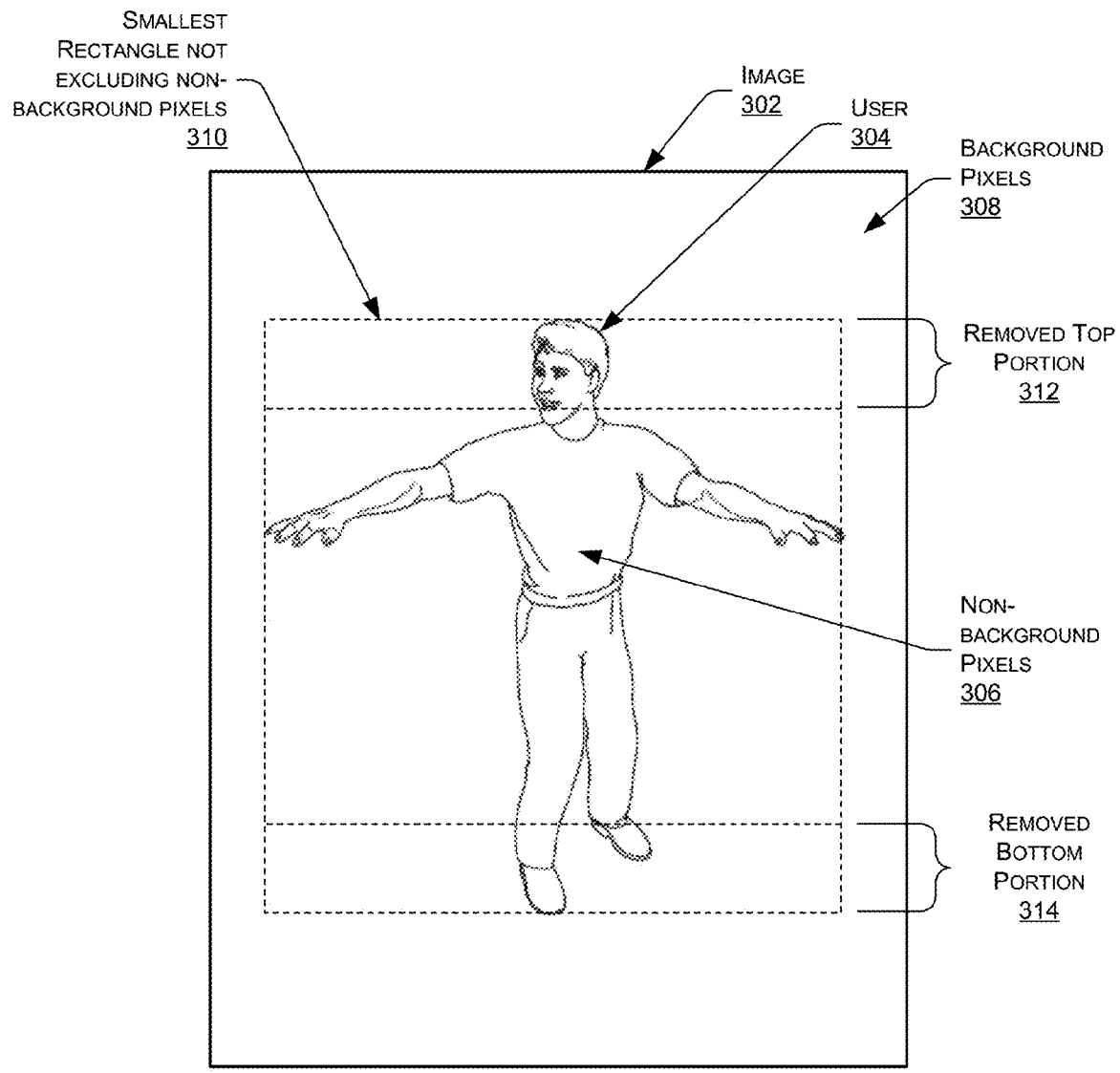
FIGS. 3A-3B illustrate the defining of a first example ROI that the image-recognition service may analyze when determining whether the corresponding image includes a particular item. Here, the first ROI corresponds to the full body of the user.
Figure 3B:
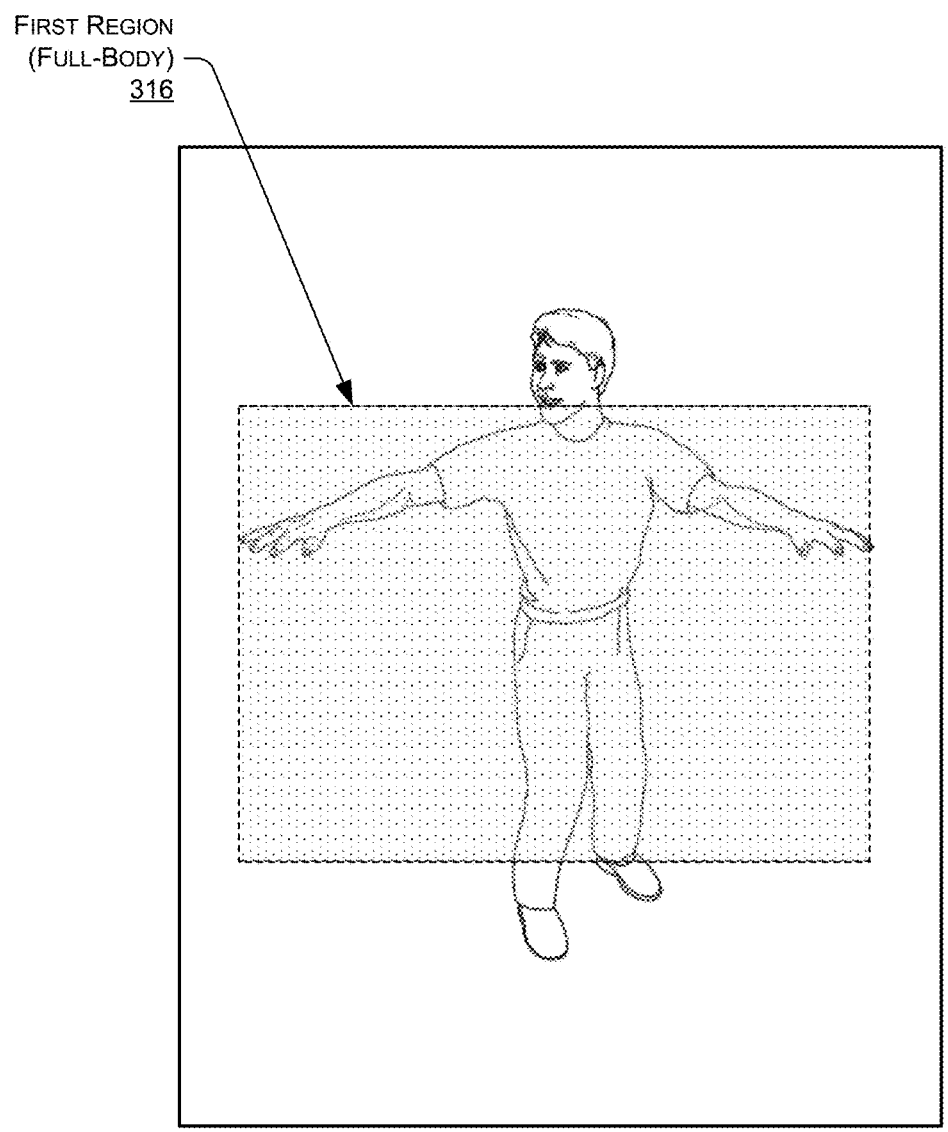

FIGS. 3A-3B illustrate the defining of a first example ROI that the image-recognition service 108 may analyze when determining whether a corresponding image 302 includes a particular item, such as the example T-shirt 110 from FIG. 1. As illustrated, the image 302 here depicts a user 304 wearing a top item of clothing—a T-shirt—and a bottom item of clothing—jeans. The user 304 may additionally or alternatively wear another type of clothing item, such as jewelry, shoes, a belt, a hat, and/or the like. In addition, the image 302 includes non-background pixels 306 (or "user pixels" in this instance) that correspond to the user in the image and background pixels 308 that do not correspond to the user. In some instances, the region-definition module 140 may process the image to identify and label each pixel of the image 302 as a background pixel or a non-background pixel. Further, in some instances the region-definition module may label pixels corresponding to skin of the user as background pixels, along with images that include any part of the user or clothing of the user. Therefore, the remaining non-background (or "user") pixels may correspond to clothed portions of the user. To identify the skin of the user, the module 140 may identify portions of the image corresponding to known color ranges associated with human skin. Further, while the examples below define ROIs that include skin of the user, in instances where user skin is designated as background pixels, these regions may generally exclude user skin. In some instances, the techniques may identify ROIs that include user skin and ROIs that do not. Further, while the above example describes the region-definition module 140 identifying the background and non-background pixels, in some instances the local device that captures the images may perform this analysis and may provide, to the image-recognition service 108 and along with each image, a binary map indicating which pixels of the image are background pixels and which are not. In some instances, this map (or another provided map) may also indicate a depth of each pixel within the image, which may be used to calculate depths of objects within the image, such as a depth of a user within the image. To create such a depth map, the client device may include a depth sensor and an RGB camera with overlapping fields-of-view. The depth sensor and the RGB camera may be calibrated such that the device how images captured by these respective cameras align with one another. The client device may then create a depth map based this alignment, and provide the indication of background and non-background pixels via this depth map.

The region-definition module 140 may begin by identifying a smallest rectangular area 310 defined with the image that does not exclude any of the non-background pixels 306 (or does not exclude a threshold amount of the non-background pixels, such as 1%, 5%, 20%, etc.). This rectangular area 310, and each rectangular area described herein, may be described in terms of corresponding X-Y coordinates of the respective image.

After identifying the rectangle 310, the region-definition module 140 may identify a top portion 312 to be removed from the rectangle 310 and a bottom portion 314 to be removed from the rectangle. For instance, the region-definition module may designate a top 10% (or any other amount) of the rectangle 310 as the top portion 312, and a bottom 10% (or any other amount) of the rectangle 310 as the bottom portion 314. The resulting rectangle defined by removing the top and bottom portions from the rectangular area 310 may then be designated as the first region in this particular example.

FIG. 3B illustrates a first region 316 that results from removing the top and bottom portions from the rectangular area 310. The region-definition module 140 may store the first region 316 in association with the image 302, such that the image-recognition module 138 may later analyze features of the first region 316 to determine the first region 316 includes a particular item. To store the region, the region-definition module 140 may, for instance, store an indication of X-Y coordinates of the image 302 that correspond to the first region 316 or may segment and store the first region 316 in its entirety.

Figure 4A:
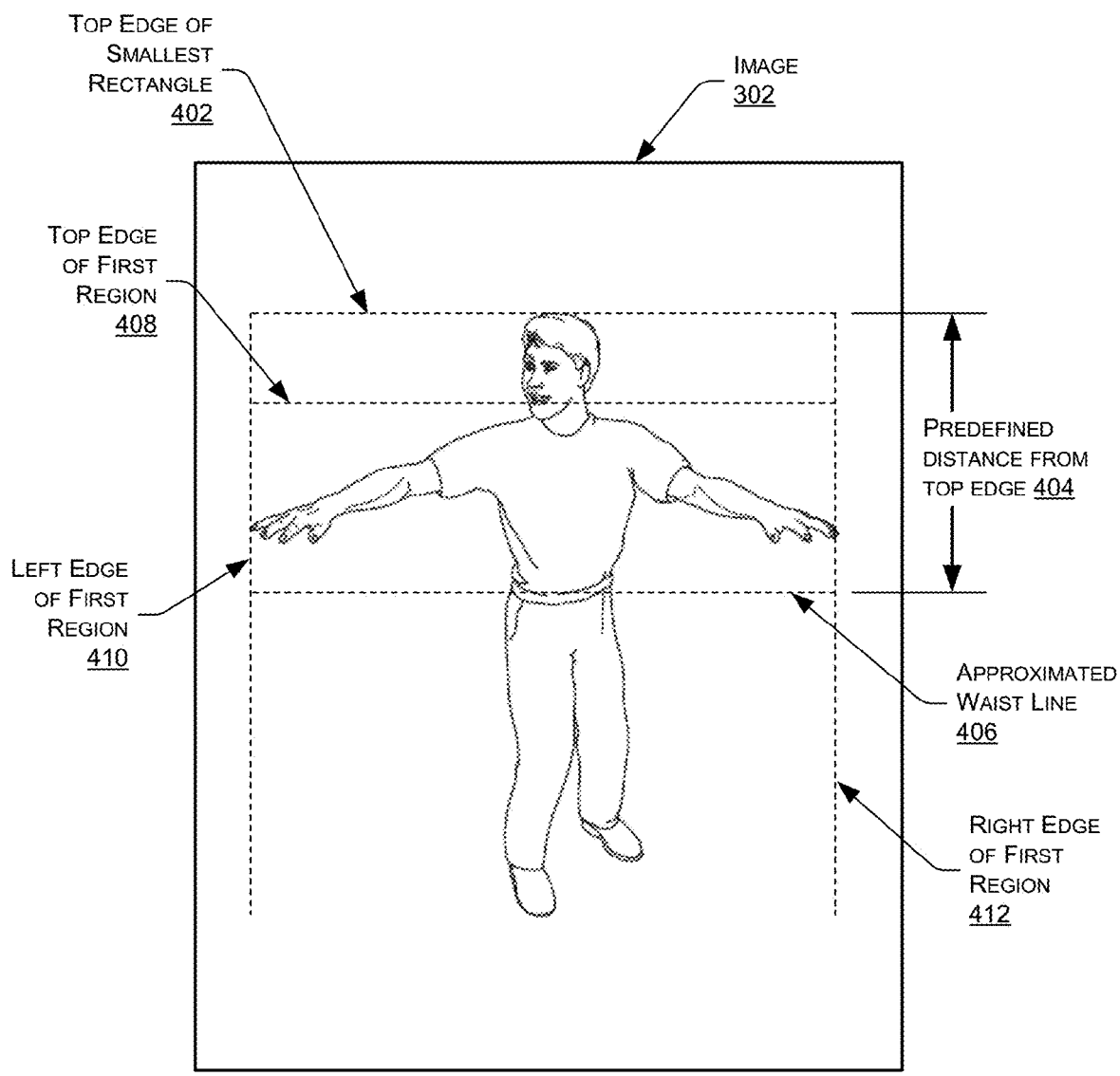
FIGS. 4A-4B illustrate the defining of a second example ROI that the image-recognition service may analyze when determining whether the corresponding image includes a particular item. Here, the second ROI corresponds to the torso of the user.
Figure 4B:
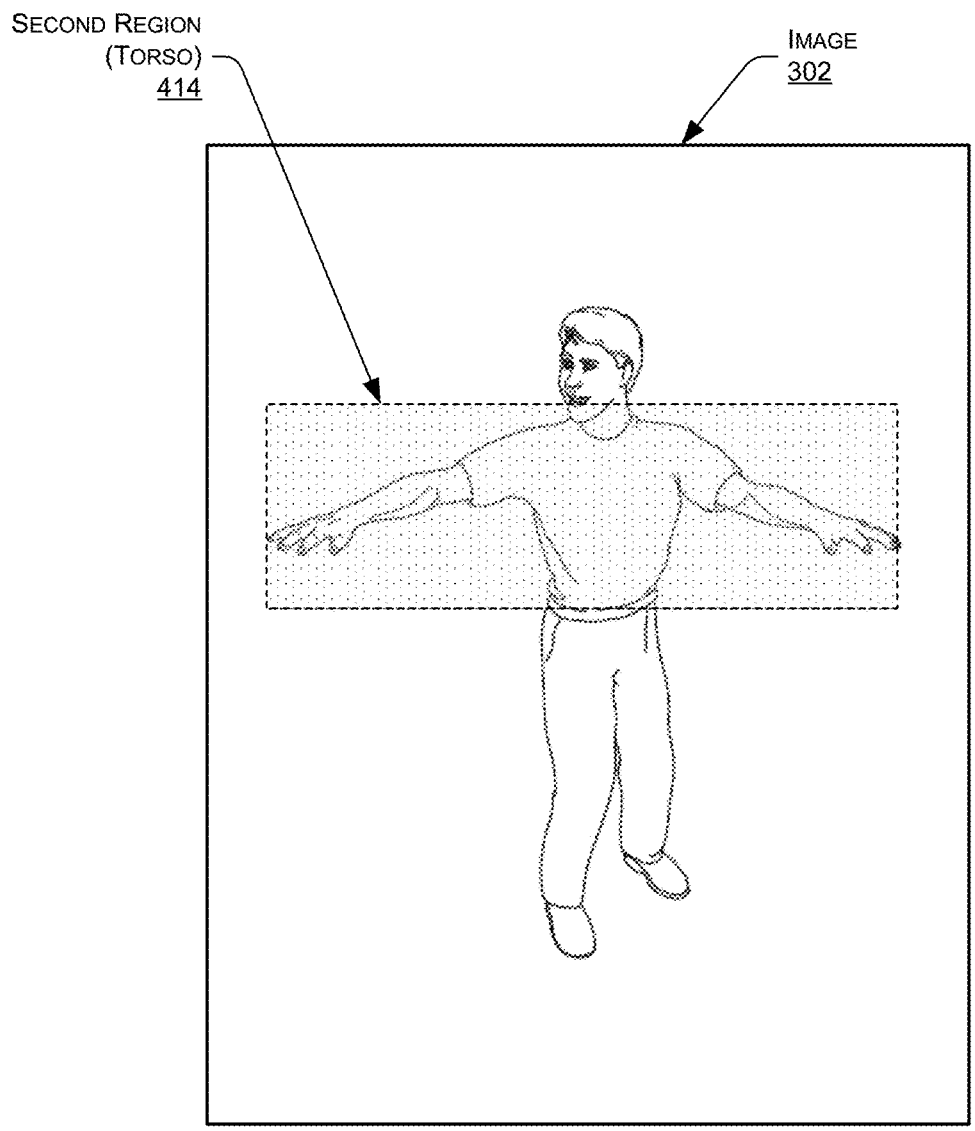

FIGS. 4A-4B illustrate the defining of a second example ROI that the image-recognition service 108 may analyze when determining whether a corresponding image 302 includes a particular item, such as the example T-shirt 110 from FIG. 1. To begin, the region-definition module 140 may identify a top edge 402 of the rectangle 310 described above with reference to FIG. 3A. The module 140 may then determine a predefined amount down 404 from this top edge and may deem a horizontal line as an approximate waist line 406 of the user 304. That is, the module 140 may be configured to measure a predefined amount down, such as 40% of the total length of the rectangular area 310, and then deem this the estimated waist line 406. This measurement may be determined based on common user proportions. Further, while FIG. 4A illustrates measuring the distance from the top edge 402, in other instances the waist line may be determined with reference to a top edge of the first region 408, a bottom edge or the first region, or the like.

After approximating the waist line 406, the region-definition module 140 may identify the top edge of the first region 408, a left edge of the first region 410 and a right edge of the first region 412. The region-definition module 140 may then define, as a second region, the rectangle resulting from the top edge 408, the right edge 412, the waist line 406, and the left edge 410. FIG. 4B illustrates the resulting second region 414. As illustrated, the second region may substantially correspond to (i.e., may include substantially all of) the torso of the user including the arms of the user in some instances.

Figure 5A:
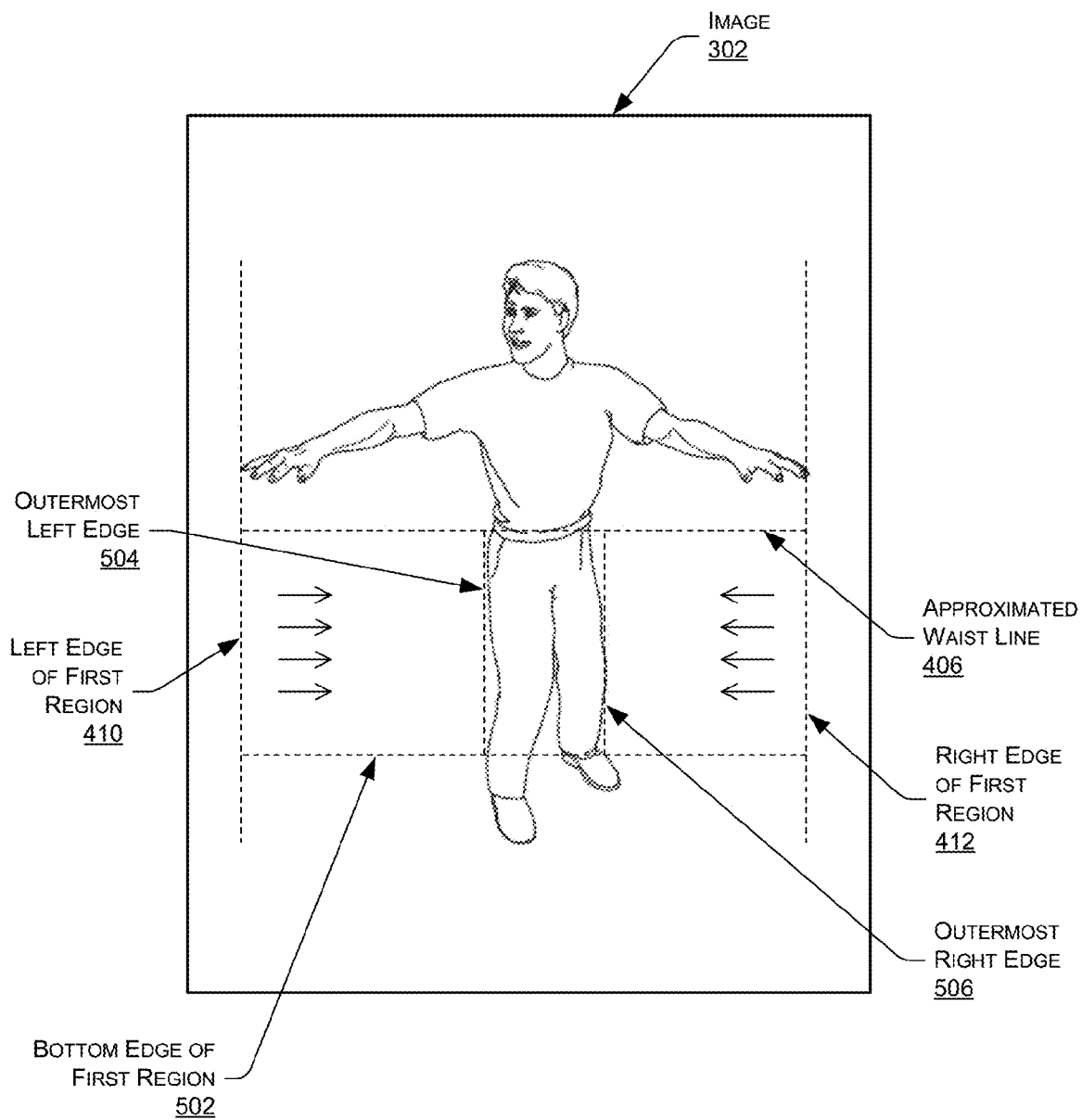
FIGS. 5A-5B illustrate the defining of a third example ROI that the image-recognition service may analyze when determining whether the corresponding image includes a particular item. Here, the third ROI corresponds to the legs of the user.
Figure 5B:
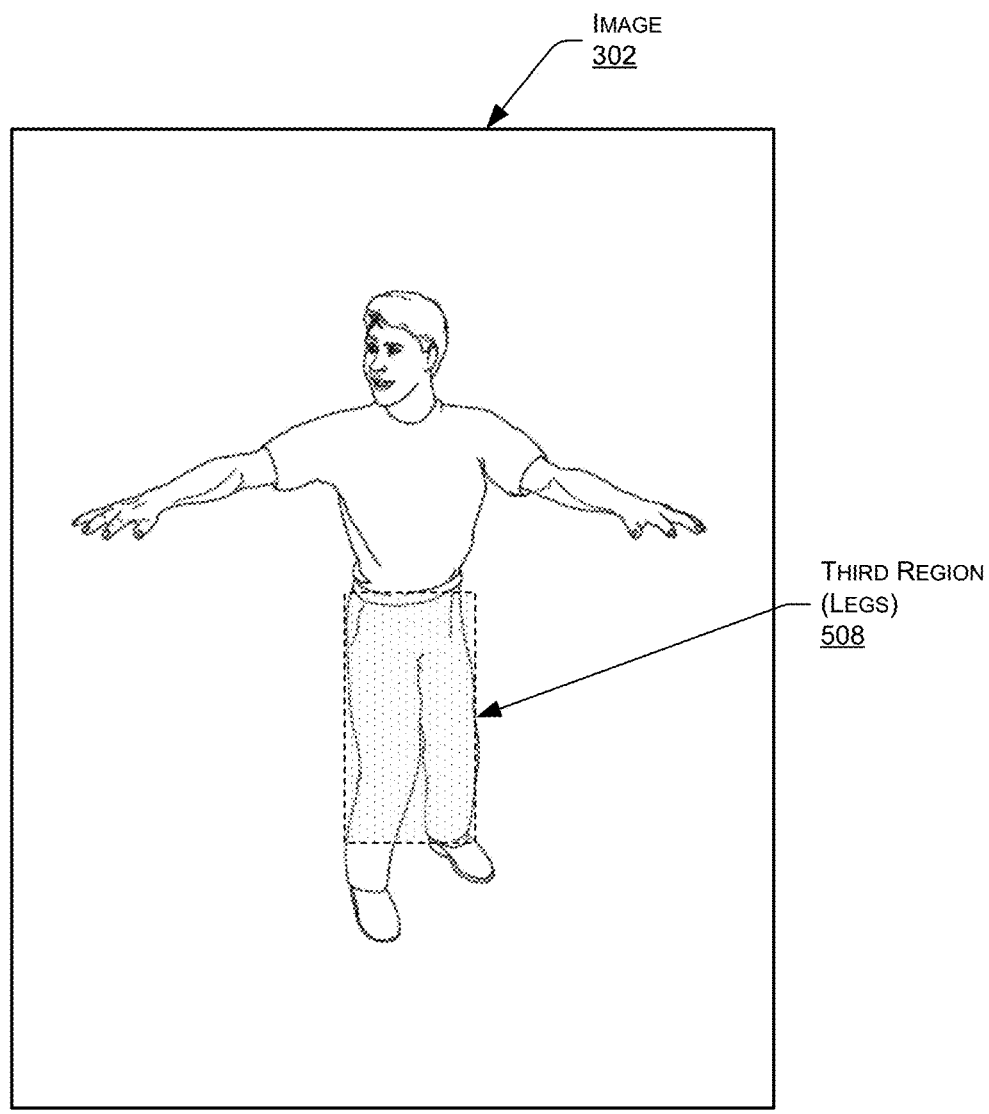

FIGS. 5A-5B illustrate the defining of a third example ROI that the image-recognition service 108 may analyze when determining whether the corresponding image includes a particular item. To begin, the region-definition module 140 may identify the approximated waist line 406 and a bottom edge of the first region 502, which will form the top and bottom boundaries of the third region. In addition, the region-definition module 140 may identify a vertical line that is furthest to the left of the image, between the waist line 406 and the bottom edge 502, that includes a non-background pixel. That is, the region-definition module 140 may be thought of as essentially moving in the left edge of the first region 410 until that edge encounters, between the waist line 406 and the bottom edge 502, a non-background pixel. This line may be deemed a left outermost edge 504. Similarly, the region-definition module 140 may identify a vertical line that is furthest to the right of the image, between the waist line 406 and the bottom edge 502, that includes a non-background pixel. That is, the region-definition module 140 may be thought of as essentially moving in the right edge of the first region 412 until that edge encounters, between the waist line 406 and the bottom edge 502, a non-background pixel. This line may be deemed a right outermost edge 506. Of course, while this example describes defining the right and left edges as the first lines that include non-background pixels, in other instances these edges may be the first edges that include a threshold amount of non-background pixels (e.g., 5%, 10%, etc.), the last edges that include all background pixels, or the like. FIG. 5B illustrates a resulting third region 508, which in this example substantially corresponds to legs or a bottom half of the user 304.

Figure 6A:
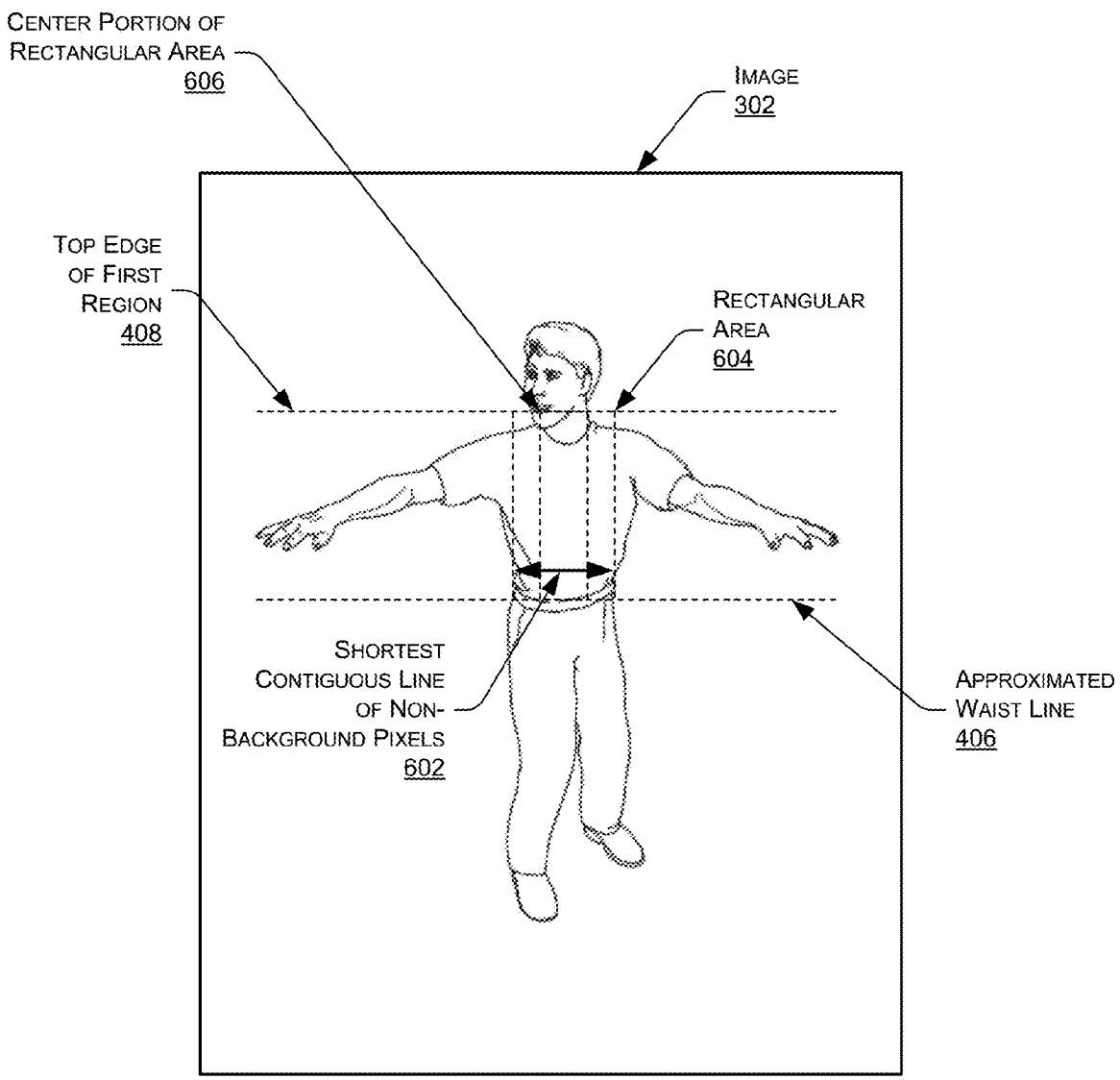
FIGS. 6A-6B illustrate the defining of a fourth example ROI that the image-recognition service may analyze when determining whether the corresponding image includes a particular item. Here, the fourth ROI corresponds to a center portion of the torso of the user.
Figure 6B:
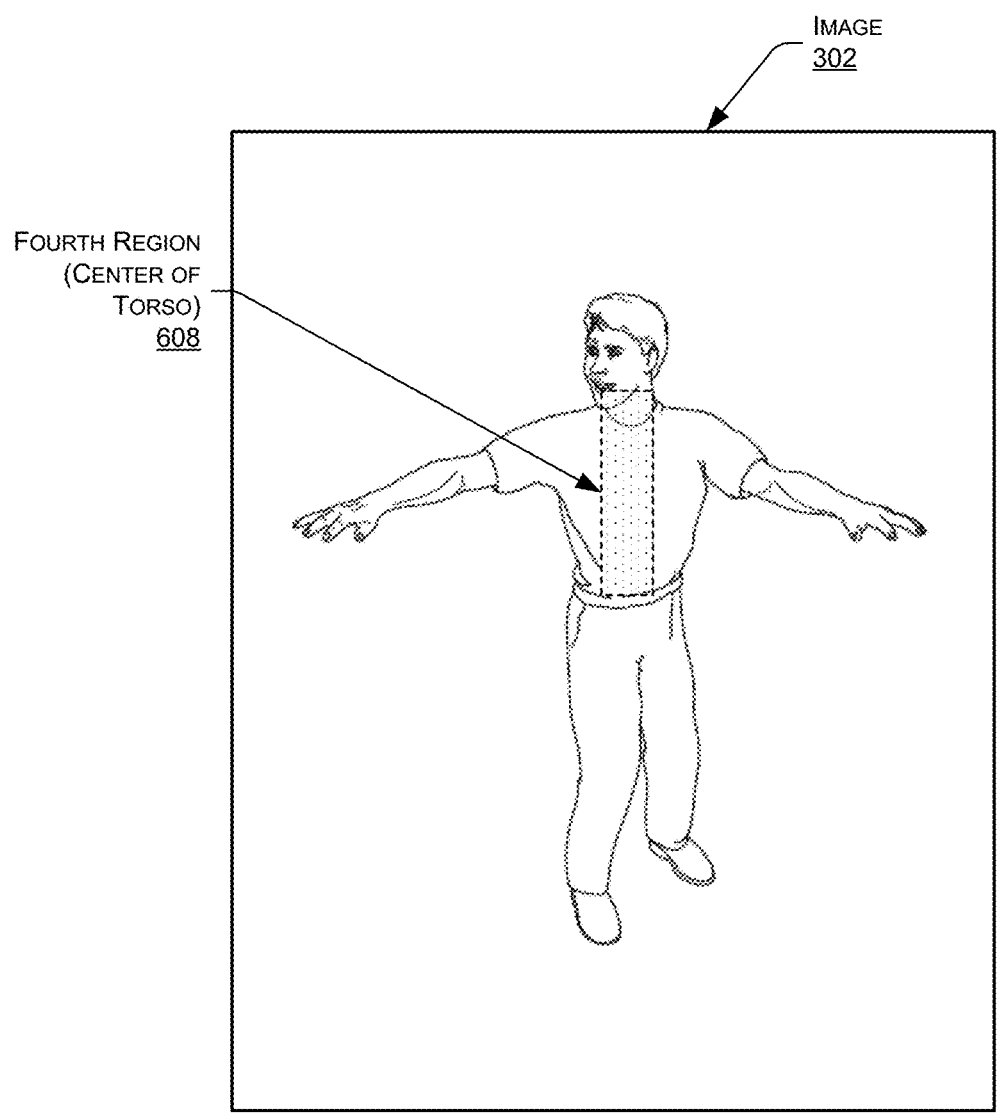

FIGS. 6A-6B illustrate the defining of a fourth example ROI that the image-recognition service 108 may analyze when determining whether the corresponding image includes a particular item. To begin, the region-definition module 140 may identify a shortest contiguous line of non-background pixels 602 between the top edge of the first region 408 and the approximated waist line 406. As illustrated, this shortest line 602 occurs near the waist of the user 304. The top edge of the first region 408, the waist line 406, and horizontal lines defined by the shortest contiguous line 602 then define a rectangular area 604. The region-definition module 140 may use this rectangular area 604 to define the fourth region. For instance, the fourth region may comprise some or all of this area 604. In this example, the module 140 defines a center portion of the rectangular area 606 as the fourth region. For instance, the module 140 may define the middle 50% (or other amount) of the rectangular area 604 as the fourth region. FIG. 6B illustrates a fourth region 608 of the image 302, corresponding to a center portion of the torso of the user.

Further, in other instances, rather than beginning by identifying the shortest contiguous line of non-background pixels 602 between the top edge of the first region 408 and the approximated waist line 406, the techniques may identify, for each scan line of pixels between the top edge of the first region 408 and the approximated waist line 406, each section of contiguous non-background pixels. From these contiguous lines of pixels, the module 140 may identify the widest line, which may typically correspond to the torso rather than the arms of the user. After identifying each widest line on a per-scan-line basis between the top edge of the first region 408 and the approximated waist line 406, the module 140 may identify the shortest of these candidate lines. The shortest of these candidate contiguous lines of pixels may then be used to define the rectangular area 604 and, thereafter, the rectangular area 606 and the fourth region 608.

Figure 7:
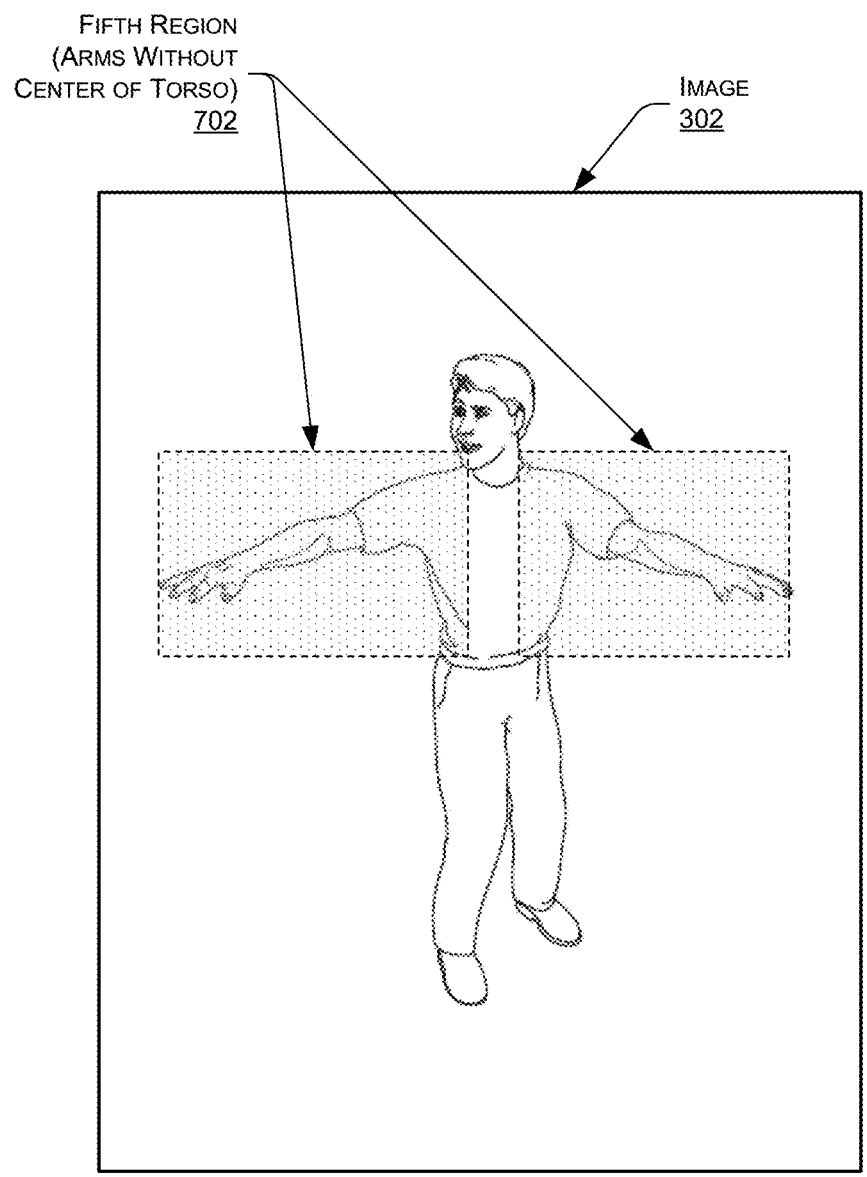
FIG. 7 illustrates the defining of a fifth example ROI that the image-recognition service may analyze when determining whether the corresponding image includes a particular item. Here, the fifth ROI corresponds to the torso of the user less the center portion of the torso.

FIG. 7 illustrates the defining of a fifth example ROI 702 that the image-recognition service 108 may analyze when determining whether the corresponding image includes a particular item, such the T-shirt 110. Here, the fifth region 702 corresponds to the torso of the user less the center portion of the torso. That is, the region-definition module 140 may define the fifth region 702 as the area of the image 302 corresponding to the second region less the fourth region. As described above, the fourth region may be used to identify a shirt of a user that is underneath an unzipped jacket or sweater, for example, while the fifth region may be used to identify the unzipped jacket or sweater. Further, while FIG. 7 illustrates the fifth region 702 as the second region less the fourth region, in some instances the fifth region 702 may comprise the rectangular area 604 less the fourth region. Further, while the above discussion illustrates several example region definitions, it is to be appreciated that these regions are merely examples and that any other number of different regions may be utilized herein.

Figure 8:
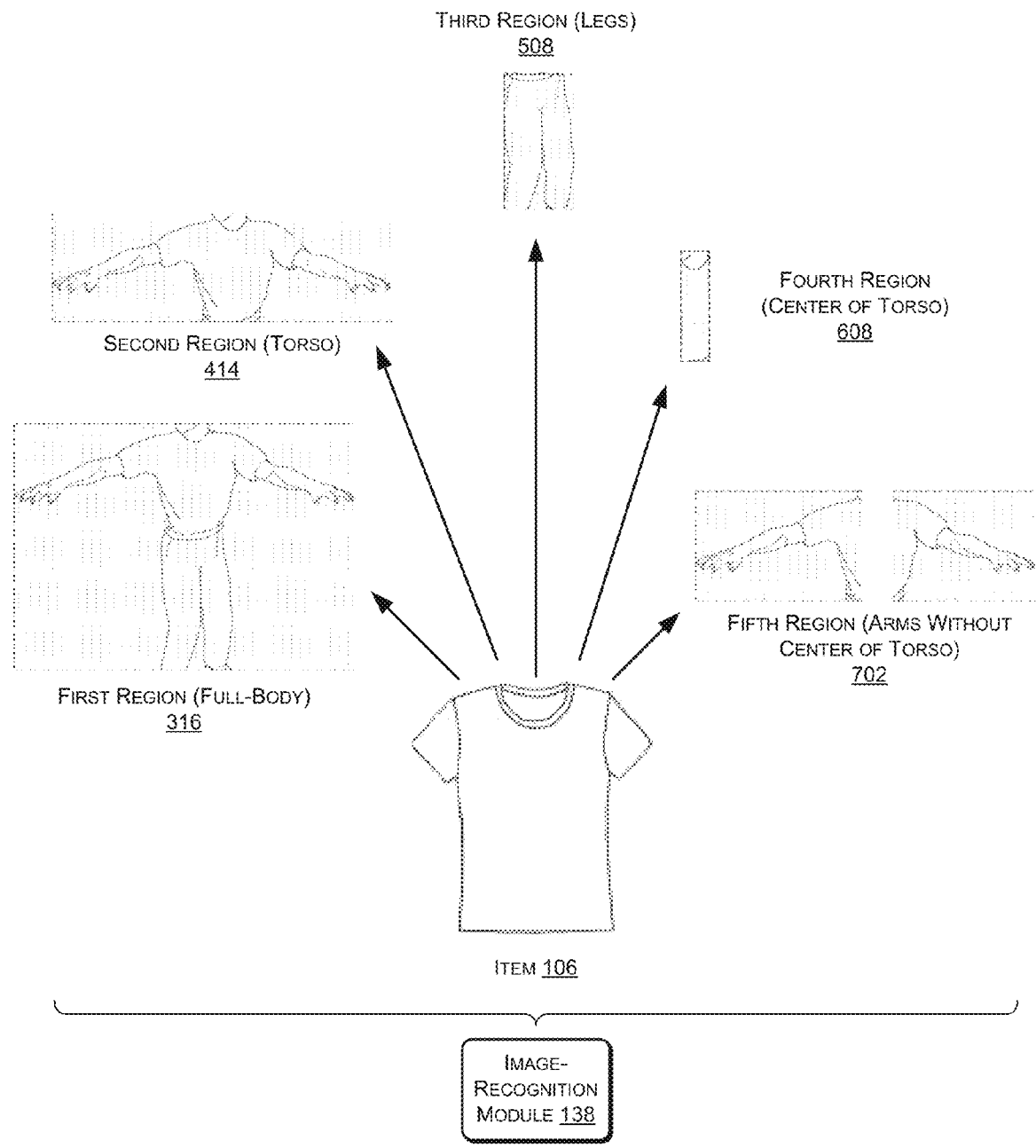
FIG. 8 illustrates that features of a particular item may be compared to features of the five example ROIs to determine whether one or more of the ROIs depict the particular item.

FIG. 8, meanwhile, illustrates that the image-recognition module 138 may compare features of a particular item, such as the shirt 110, to features of the five example ROIs to determine whether one or more of the ROIs depict the particular item. That is, the image-recognition module may utilize a trained neural network or other classifier to compare features of the item 110 to the first region 316, the second region 414, the third region 508, the fourth region 608, and/or the fifth region 702. In some instances, the image-recognition module may utilize a trained neural network or other classifier to compare features of the item 110 to each sub-region or block of pixels of the fifth region 702 (i.e., one comparison to the block on the left and one to the block on the right), effectively treating the fifth region 702 as two discrete regions. In either instance, in response to one or more of these regions being deemed a match, the image-recognition module may output an indication that the corresponding image 302 depicts the particular item 110. In this example, it will be appreciated that the image-recognition may find a match between the example T-shirt and one or more of the first, second, fourth, and fifth regions (which illustrate the T-shirt) while not finding a match between the T-shirt and the third region (which illustrates the jeans of the user).

To train a neural network or other classifier, pixels of images containing a particular item (e.g., a clothing item) are input into the classifier and feature values are then extracted. Thereafter, feature vectors may be computed for individual ROIs of individual images. These feature vectors are then compared to corresponding feature vector of the particular item to determine, for each ROI, a degree to which the ROI contains the particular item.

Figure 9:
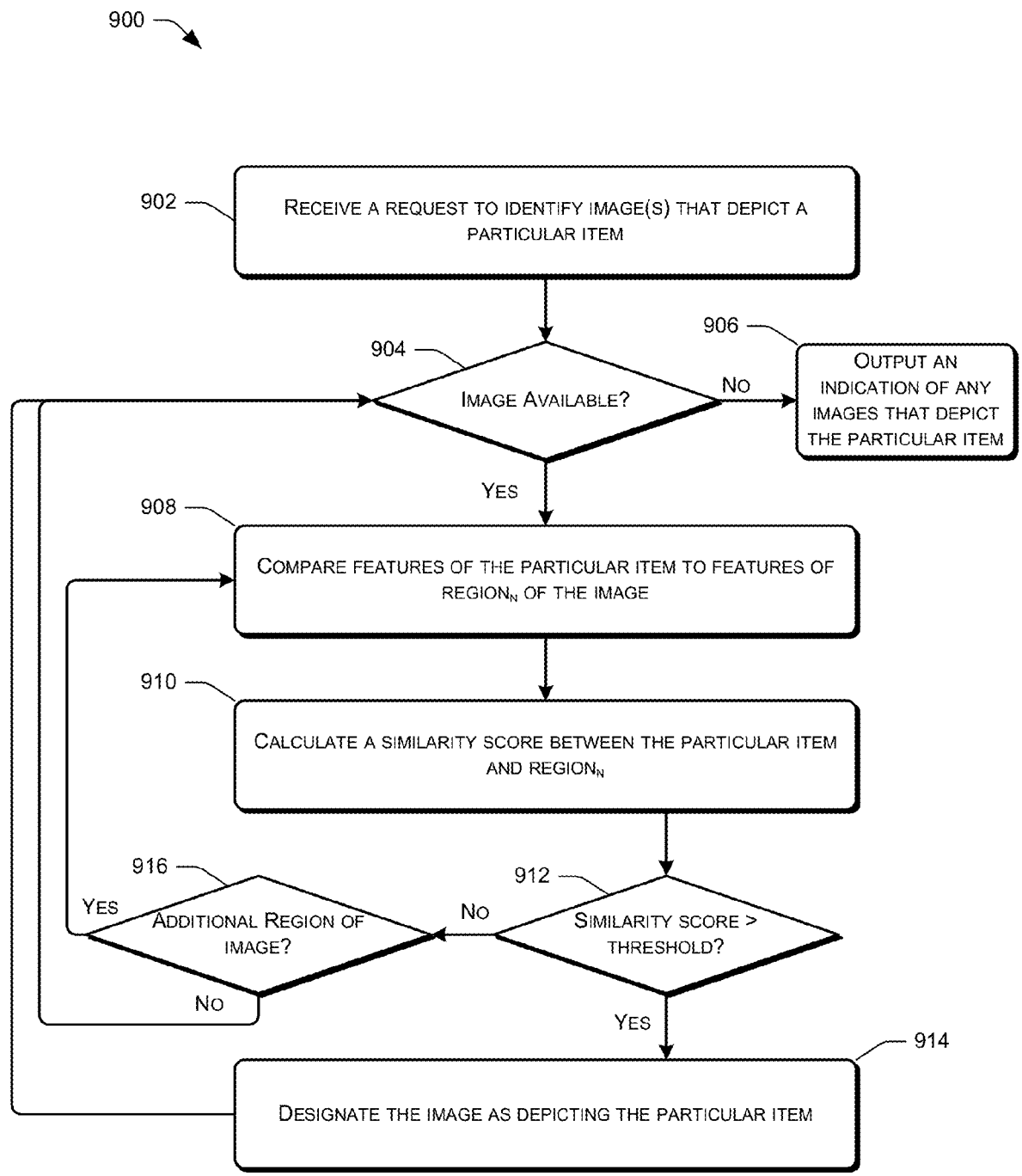
FIG. 9 illustrates a flow diagram of an example process that includes a process for receiving a request to identify images that depict a particular item and comparing features of the item to features of ROIs.

FIG. 9 illustrates a flow diagram of an example process 900 that includes a process for receiving a request to identify images that depict a particular item and comparing features of the item to features of ROIs in response. In some instances, the region-definition module 140 and/or the image-recognition module 138 may perform some or all of the process 900.

At 902, the process 900 receives a request to identify images that depict a particular item. As discussed above, for example, a user may select an item via a GUI, may indicate an item audibly, may indicate the item by holding up the item to a camera of a device or the user, or may issue the request in any other manner. It is noted that while FIG. 9 illustrates first receiving a request and then performing the matching process, as described above, the matching process may be performed prior to a request (e.g., may be performed on images in response them being uploaded).

At 904, the process 900 determines whether there is image data corresponding to an image available to analyze. If not, then the at 906 the process 900 outputs an indication of any images that depict the item, if any. For instance, if the user had yet to upload images, or if no images were otherwise available to analyze, then the process 900 would simply output an indication that no images depict the item.

In this example, however, the user has previously uploaded multiple images and, thus, the process proceeds to operation 908 for first image data (corresponding to a first image). At 908, the process 900 compares features of the particular item to features of a first region of the first image data. In some instances, this includes first filtering out the region if it does not have a color histogram that match (by a predefined amount) a color histogram of the particular item. If, however, the first region has a color histogram that does match, then features of the first region may be compared to features of the particular item using a trained classifier, such as a CNN. In other instances, meanwhile, the similarity may be computed by combining color-histogram similarity with similarity determined using a trained classifier, such as the CNN. In either instance, at 910, the process 900 calculates a similarity between the features of the particular item and the features of the first region and, at 912, determines whether the similarity is greater than a threshold similarity. If the similarity is greater than the threshold similarity, then at 914 the process 900 designates the image data as depicting the particular item. In some instances, the process 900 utilizes a trained neural network or a trained classifier to perform the operations 910, 912, 914, and 916.

If, however, the similarity score calculated at 910 is not greater than the threshold, then at 916 the process 900 determines whether the image data includes another region. If so, then the process 900 loops back to operation 908 for the second region. This may continue until the earlier of a similarity score for a particular region of the image data being greater than the threshold or the each region of the image being analyzed without locating the particular item. When this occurs, the process 900 may loop back to operation 904, at which point the process 900 may determine whether image data for an additional image exists to be searched. This may continue until image data corresponding to each image has been searched or until another trigger occurs (e.g., locating a threshold number of images depicting the item). At this point, the process 900 may proceed to output an indication of the images that depict the particular item at 906. Of course, it is to be appreciated that the process 900 may update the indication of the matching images as the process 900 continues to search for matching images. That is, a GUI on a display of a user device may be populated with images as the process 900 identifies matching images via the matching process.

In some instances, however, the process 900 may compare each region of image data for an image to the features of the particular item, rather than cease the comparison process after identifying a region having a similarity score that is greater than a threshold. For instance, the process 900 may identify that three regions of image data for a particular image have a similarity score to features of the particular item, and may store an indication of at least the highest similarity score and, potentially, an indication of the particular region corresponding to that highest similarity score. The process 900 may assign this highest similarity score to the image, such that the images may, at the end of the process 900, be stack-ranked from most similar to the least similar based at least in part on the highest region similarity score. The top results may then be surfaced to the user, beginning with the images deemed as most similar. In addition, the region corresponding to the highest similarity score may be identified and may be used to further train the CNN or other trained classifier.

Figure 10A:
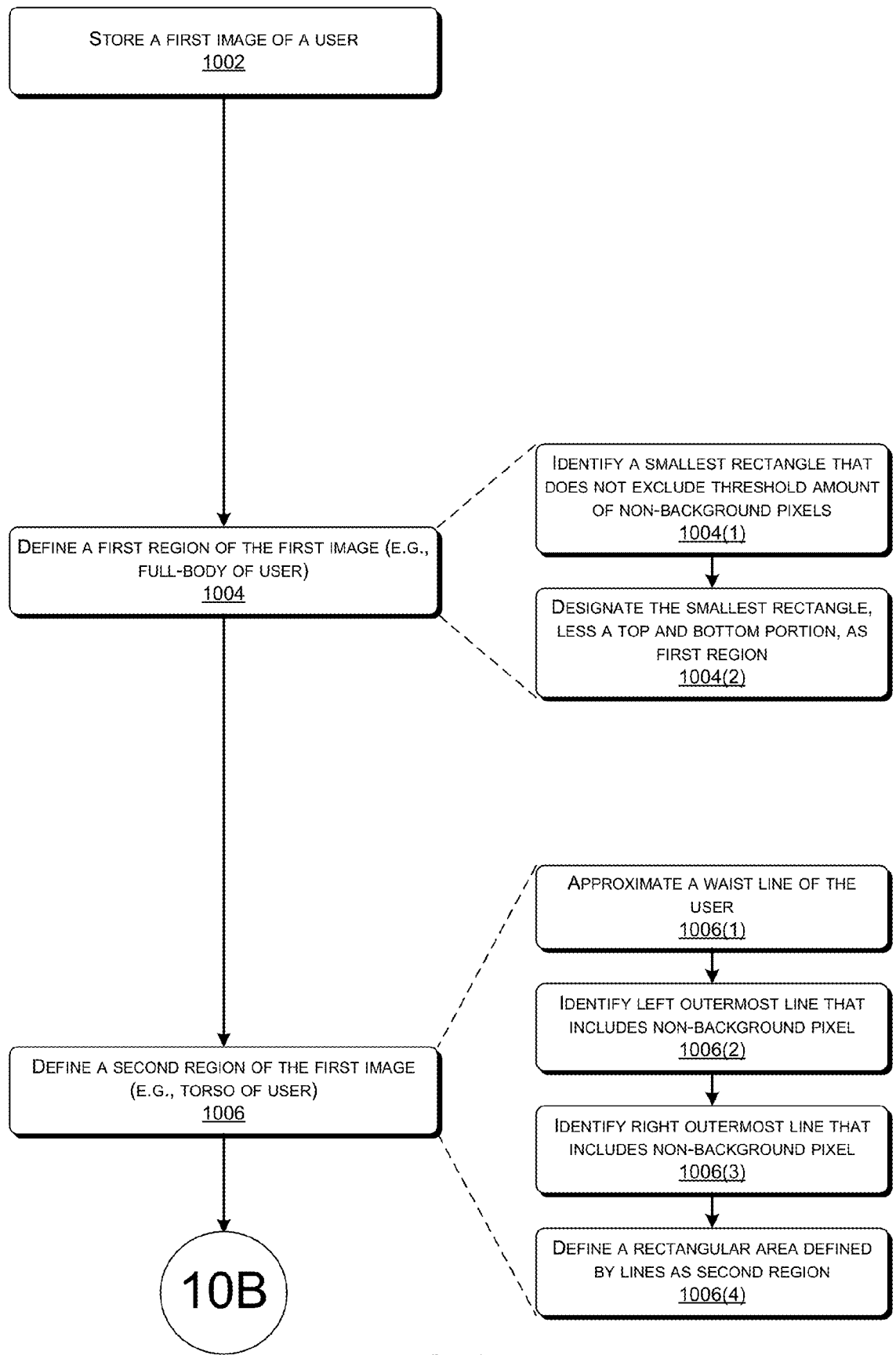
FIGS. 10A-10C collectively illustrate a flow diagram of an example process that includes receiving a request to identify images that depict a particular item, defining several example ROIs in an example image, comparing features of the particular item to features of the ROIs, determining that the image depicts the particular item, and outputting a corresponding indication.
Figure 10B:
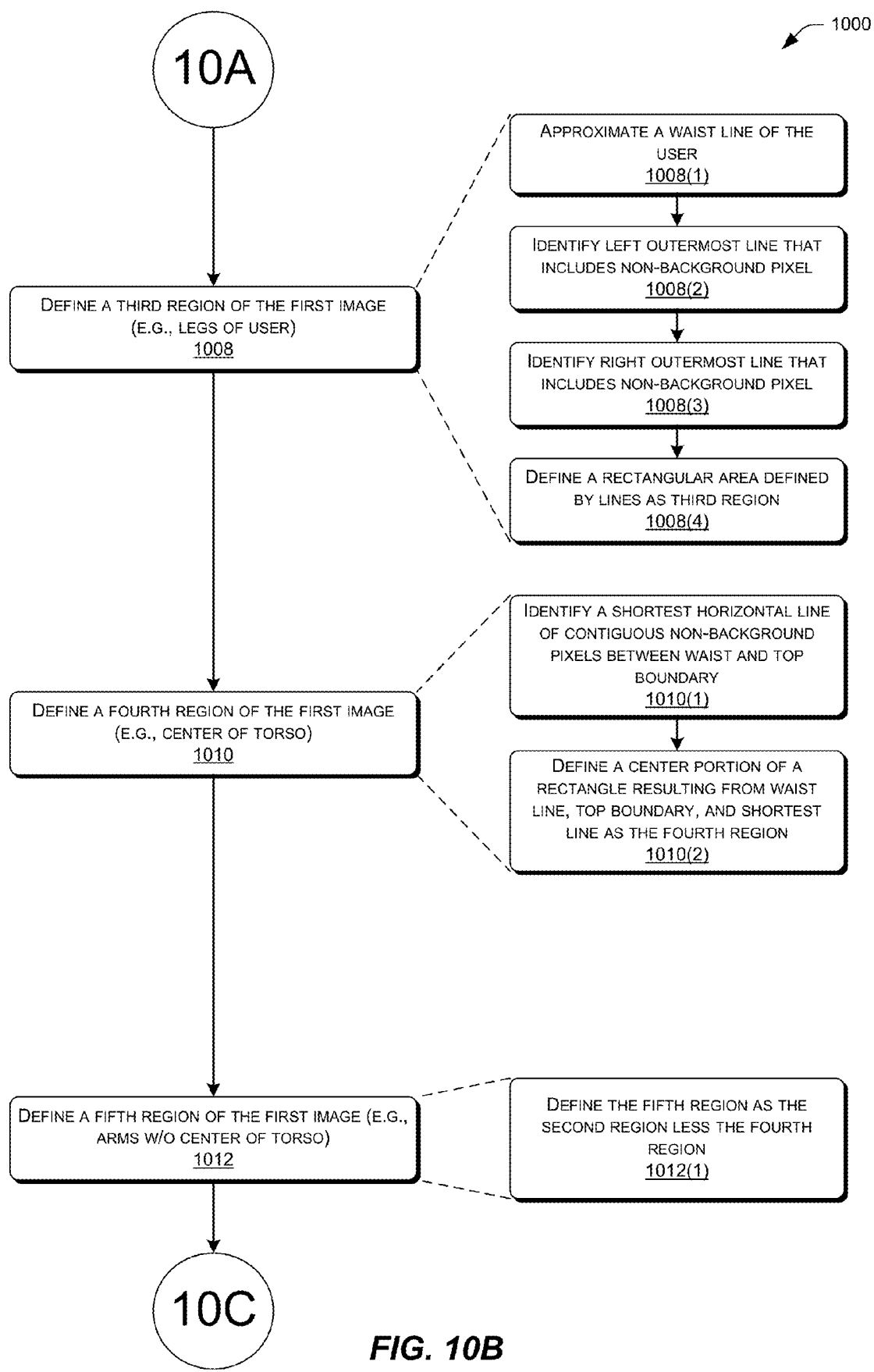
Figure 10C:
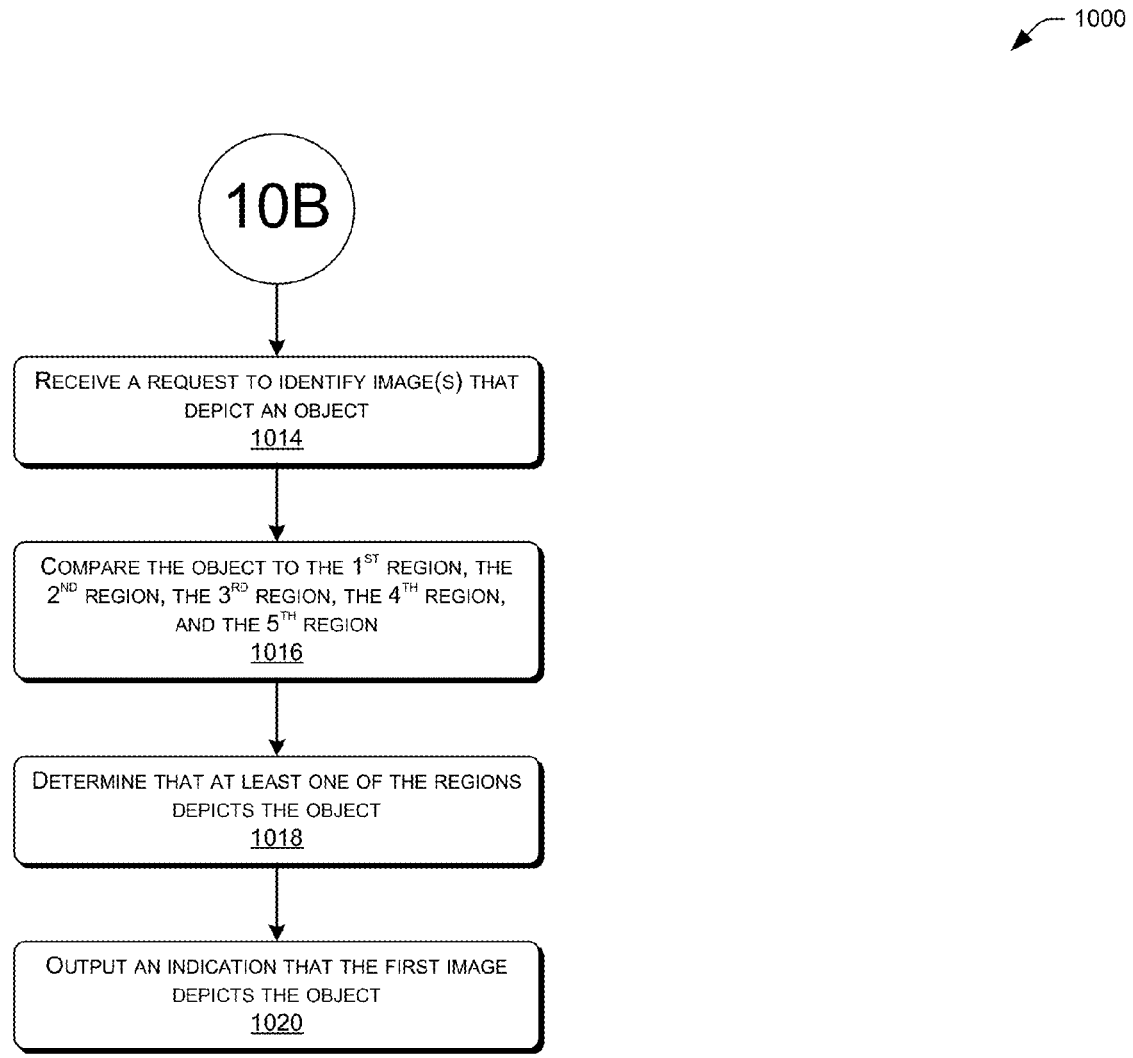

FIGS. 10A-10C collectively illustrate a flow diagram of an example process 1000 that includes, in part, defining ROIs for an image. At 1002, the process 1000 stores image data corresponding to a first image of a user. For instance, the user may upload the first image data, which may depict the user and a corresponding outfit of the user. At 1004, the process 1000 defines a first region of the image data, which may correspond to a full body of the user in the image in some instances. The operation 1004 may include sub-operations 1004(1)-(2). At 1004(1), the process 1000 may identify a smallest rectangular area of the image that does not exclude a threshold amount of non-background pixels, as discussed above with reference to FIG. 3A. At 1004(2), the process 1000 then designates this smallest rectangular area, less a top portion that likely corresponds to a head of the user and a bottom portion that likely corresponds to feet of the user, as the first region. It is to be appreciated that in some instances the first region may comprise the smallest rectangular area (including the top and bottom portions), such that the user may receive an indication of images that match a particular hat, pair of shoes, hairstyle of the user, or the like.

At 1006, the process 1000 defines a second region of the first image data, potentially using the techniques discussed above with reference to FIG. 4A. The operation 1006 may comprise sub-operations 1006(1)-(4). At 1006(1), the process 1000 approximates a waist line of the user. At 1006(2), the process 1000 identifies a left outermost line, between the top edge of the first region and the waist line, that includes a non-background pixel. At 1006(3), the process 1000 identifies a right outermost line, between the top edge of the first region and the waist line, that includes a non-background pixel. At 1006(4), the process 1000 defines the second region as a rectangular area defined by the top edge of the first region, the waist line, and the left and right outermost lines.

FIG. 10B continues the illustration of the process 1000. At 1008, the process 1000 defines a third region of the first image data, potentially using the techniques discussed above with reference to FIG. 5A. The operation 1008 may comprise sub-operations 1008(1)-(4). At 1008(1), the process 1000 approximates a waist line of the user, or uses the approximated waist line defined at 1006(1). At 1008(2), the process 1000 identifies a left outermost line, between the top edge of the first region and the waist line, that includes a non-background pixel. At 1008(3), the process 1000 identifies a right outermost line, between the top edge of the first region and the waist line, that includes a non-background pixel. At 1008(4), the process 1000 defines the third region as a rectangular area defined by the top edge of the first region, the waist line, and the left and right outermost lines.

At 1010, the process 1000 defines a fourth region of the first image data, potentially using the techniques discussed above with reference to FIG. 6A. The operation 1010 may include sub-operations 1010(1)-(2). At 1010(1), the process 1000 identifies shortest contiguous line of non-background pixels between the top edge of the first region and the approximated waist line. At 1010(2), the process 1010 then defines, as the fourth region, a center portion of a rectangle defined by the top edge of the first region, the waist line, and vertical lines located at each end of the shortest contiguous line identified at 1010(1).

At 1012, the process 1000 defines a fifth region, potentially using techniques discussed above with reference to FIG. 7. In some instances, defining the fifth region comprises defining the fifth region as the area of the image data corresponding to the second region less the fourth region, as illustrated at 1012(1).

FIG. 10C concludes the illustration of the process 1000. It is to be appreciated that while the process 1000 illustrates operations 1002-1012 with reference to a first image data, the process 1000 may repeat for image data corresponding to a second image, a third image, and so forth. At 1014, the process 1000 receives a request to identify images that depict an item or object, such as a physical item (e.g., an item of clothing), a characteristic of a user (e.g., hairstyle, smile, posture, etc.), a characteristic of an image (e.g., blurry, sunny, washed out, etc.), and/or the like. At 1016, the process 1000 compares features of the object to respective features of the first, second, third, fourth, and fifth regions of the first image data, and potentially to corresponding regions defined in other images. At 1018, in this example the process 1000 determines that at least one of the regions depicts the first object. As such, at 1020, the process 1000 outputs an indication that the first image depicts the particular object.

FIGS. 11A-11D collectively illustrate calculating an ROI size for the example image 302 based on a size of a particular item being searched for and a depth of the user in the image being searched. These figures also illustrate different regions of the image may be used, with these regions having a size corresponding to the calculated ROI size.

Figure 11A:
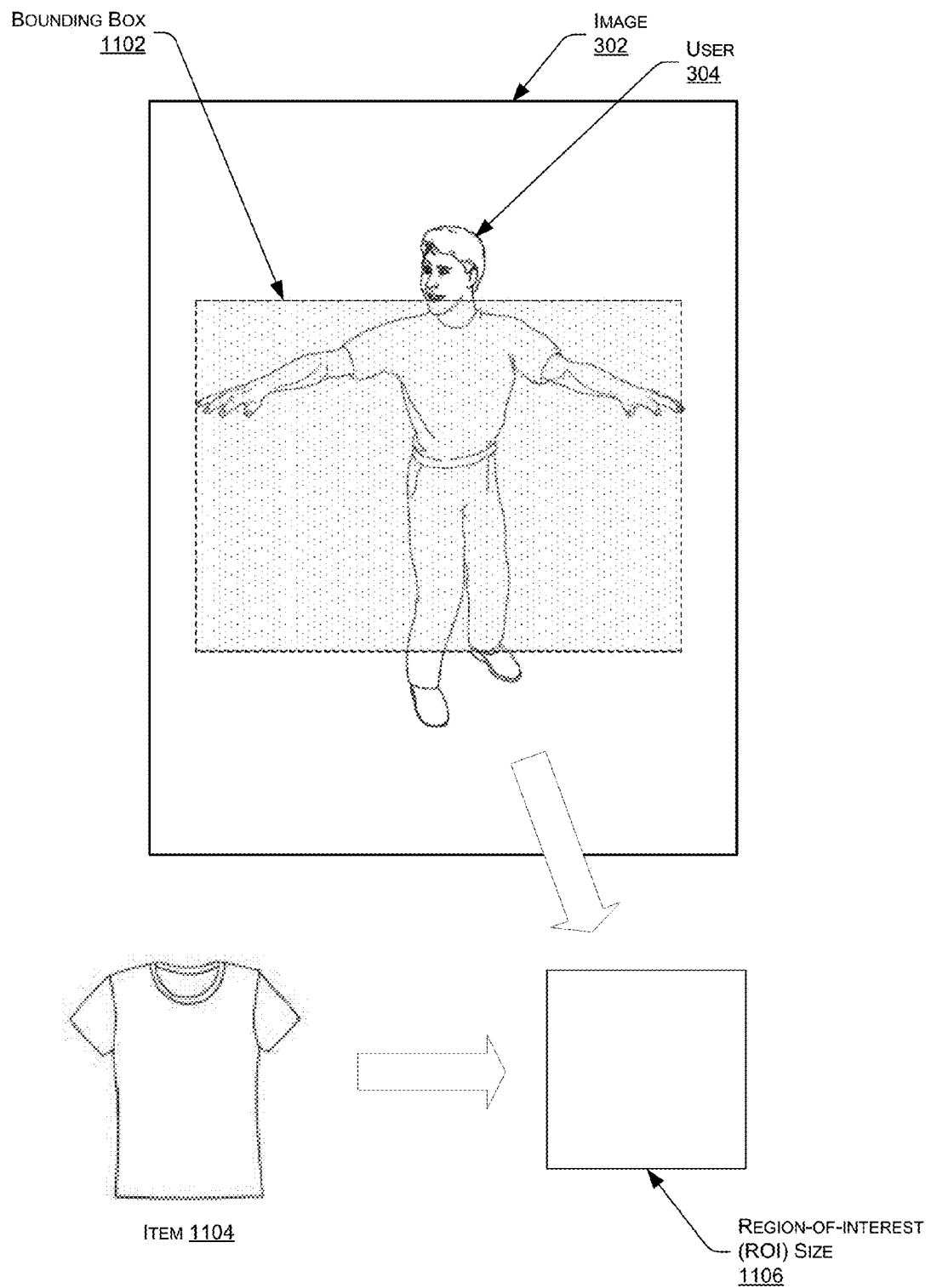
FIGS. 11A-11D collectively illustrate calculating an ROI size for an image based on a size of the particular item and a depth of the user in the image being searched. These figures also illustrate different regions of the image may be used, with these regions having a size corresponding to the calculated ROI size.

As illustrated, FIG. 11A depicts the example image 302 that includes the example user 304. In addition, this figure illustrates that an example bounding box 1102 in which the image is to be searched. In some instances, the bounding box may represent the smallest rectangle within the image that does not exclude any or a threshold amount of non-background pixels. In other instances, and as illustrated, the bounding 1102 may be calculated using the same or similar techniques to the techniques discussed above with reference to determining the first region 316.

In addition, FIG. 11A illustrates that the item requested to be located within one or more images may be used to determine the ROI size for searching the image 302. This figure, for instance, illustrates that a user or other entity is request to locate one or more images that include a particular item 1104 (here, a T-shirt). The techniques may determine the size of the T-shirt, either generally or within an image that is provided as identifying the desired item (i.e., within an image that includes the T-shirt that the user wishes to locate in other images). In addition, the techniques may also determine, for the image 302, a depth of the user 304 within the image. In some instances, each stored image may include a corresponding depth map identifying depths of objects on a per-pixel or per-pixel-block basis. As such, the techniques may approximate, using the depth map, a depth of the user 304 within the image.

Thereafter, the techniques may calculate an ROI size 1106 based on the size of the item 1104 and the depth of the user 304 (or other object that is being searched within the image 302). In instances where a user uploads or otherwise specifies an image depicting the item 1104, the techniques may also determine a depth of the item 1104 within that image. The techniques may then calculate the ROI size 1106 for the image 302 based on the size of the item 1104, the depth of the item in the provided image (i.e., the reference image), and the depth of the user in the image 304. For instance, the techniques may use Equation (1) reproduced above for determined the ROI size 1106. Using Equation, if the techniques estimate that a reference image depicting the T-shirt includes a 400 pixels box (20 pixels×20 pixels) that includes the T-shirt, and that the user is twice as far away in the image 302 as the T-shirt is in the reference image, then the techniques may determine that the ROI size 1106 should be a 10×10 box (each of the box being half of the sides of the 20×20 box), or 100 pixels. In either instance, it is to be appreciated that the ROI size 1106 may be dependent on one or both of the item being searched for and the image being searched on. As such, each image being searched on may be searched using regions having different ROI sizes, even when searching for a common item across multiple images.

Figure 11B:
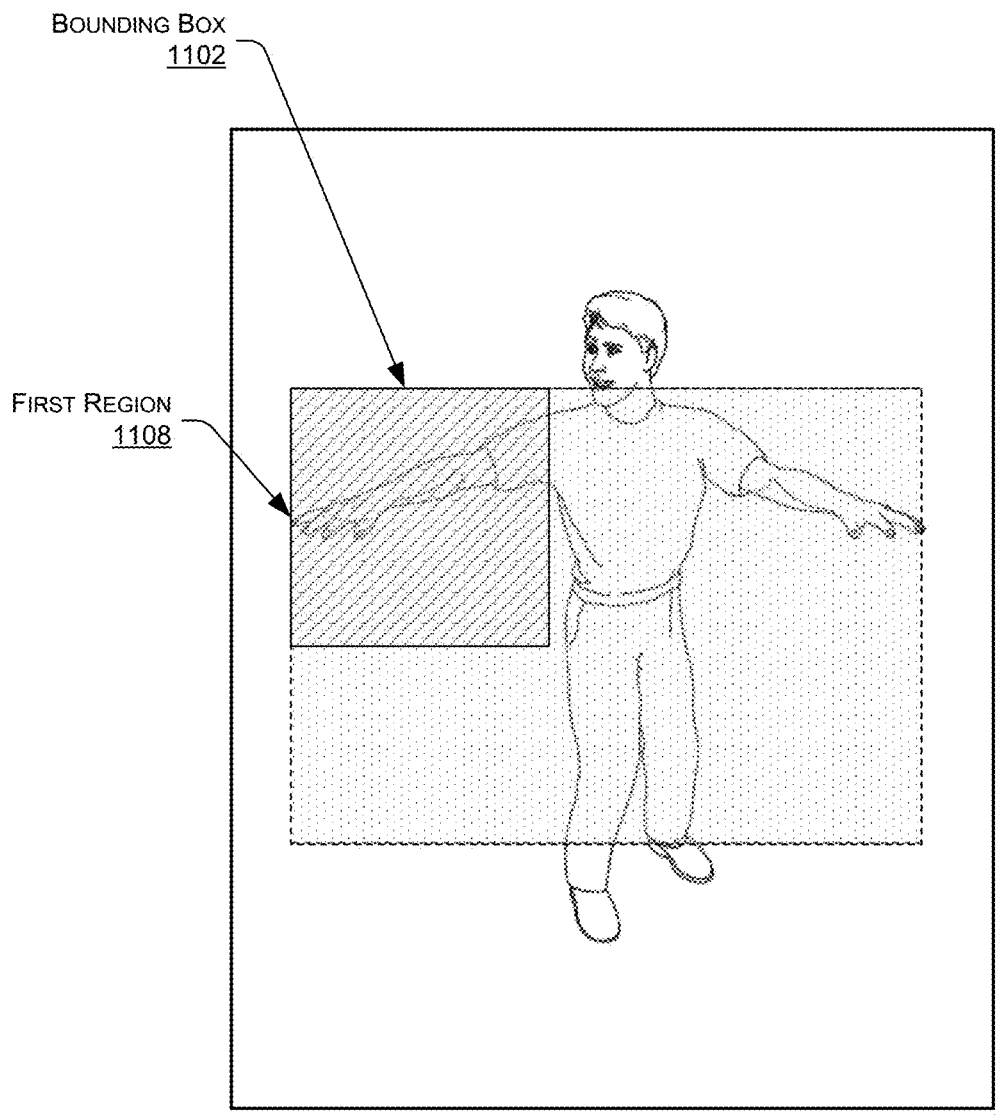

After calculating the ROI size 1106, the techniques may search for the item 1104 within the bounding box 1102. FIG. 11B, for instance, illustrates that the techniques may search for the item 1104 within a first region 1108 of the bounding box 1102. As the reader will appreciate, the size of the first region 1108 may correspond to the ROI size 1106. Further, as discussed above, searching for the item 1104 may include first calculating a color histogram for the first region or referencing a pre-computed color histogram for this region and comparing this color histogram to a color histogram associated with the item 1104. If the histograms do not match within a certain threshold level of similarity, then the techniques may move onto a subsequent region. If, however, the histograms generally match, then features of the item 1104 may be compared features of the first region 1108 using a trained classifier, such as a CNN. If the trained classifier determines that the first region 1108 matches the item 1104, then an indication may be stored that the image 302 includes the item 1104, as described above.

Figure 11C:
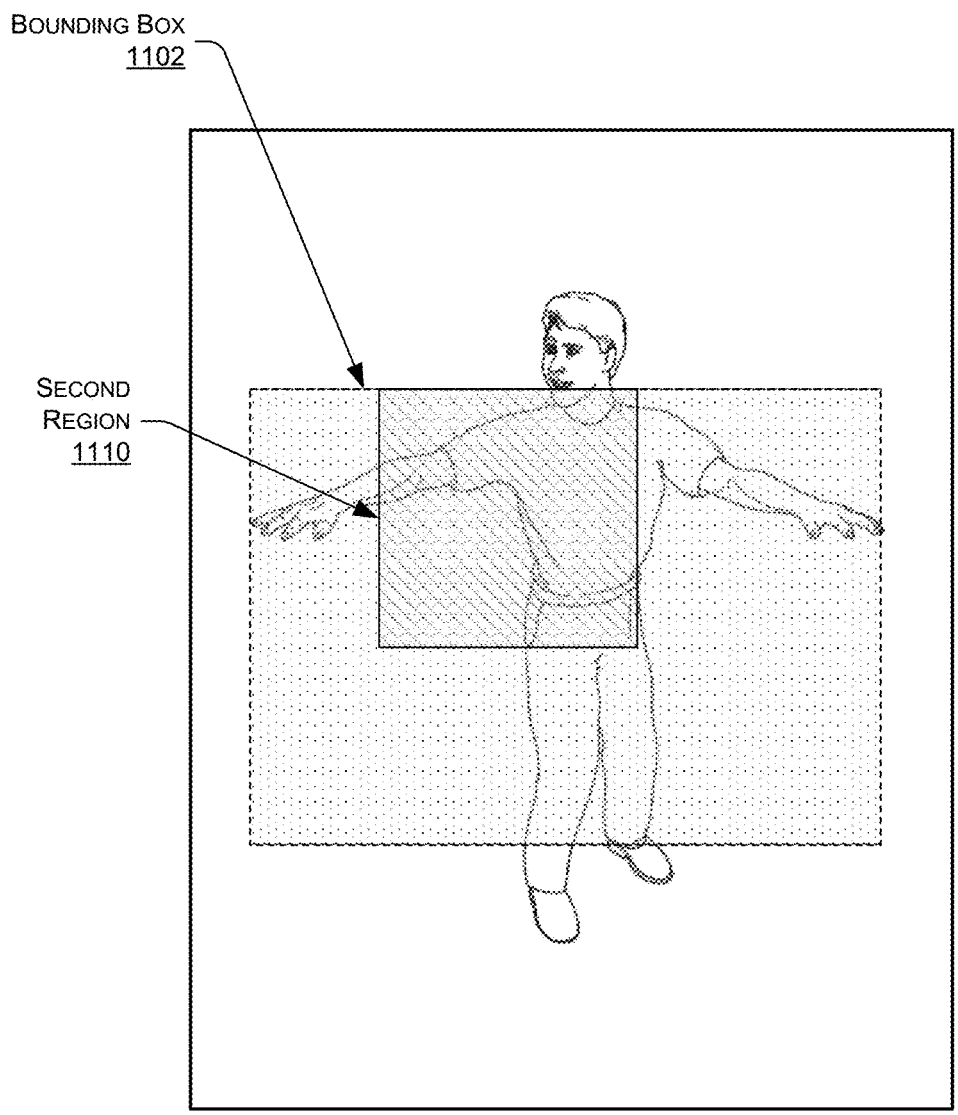
Figure 11D:
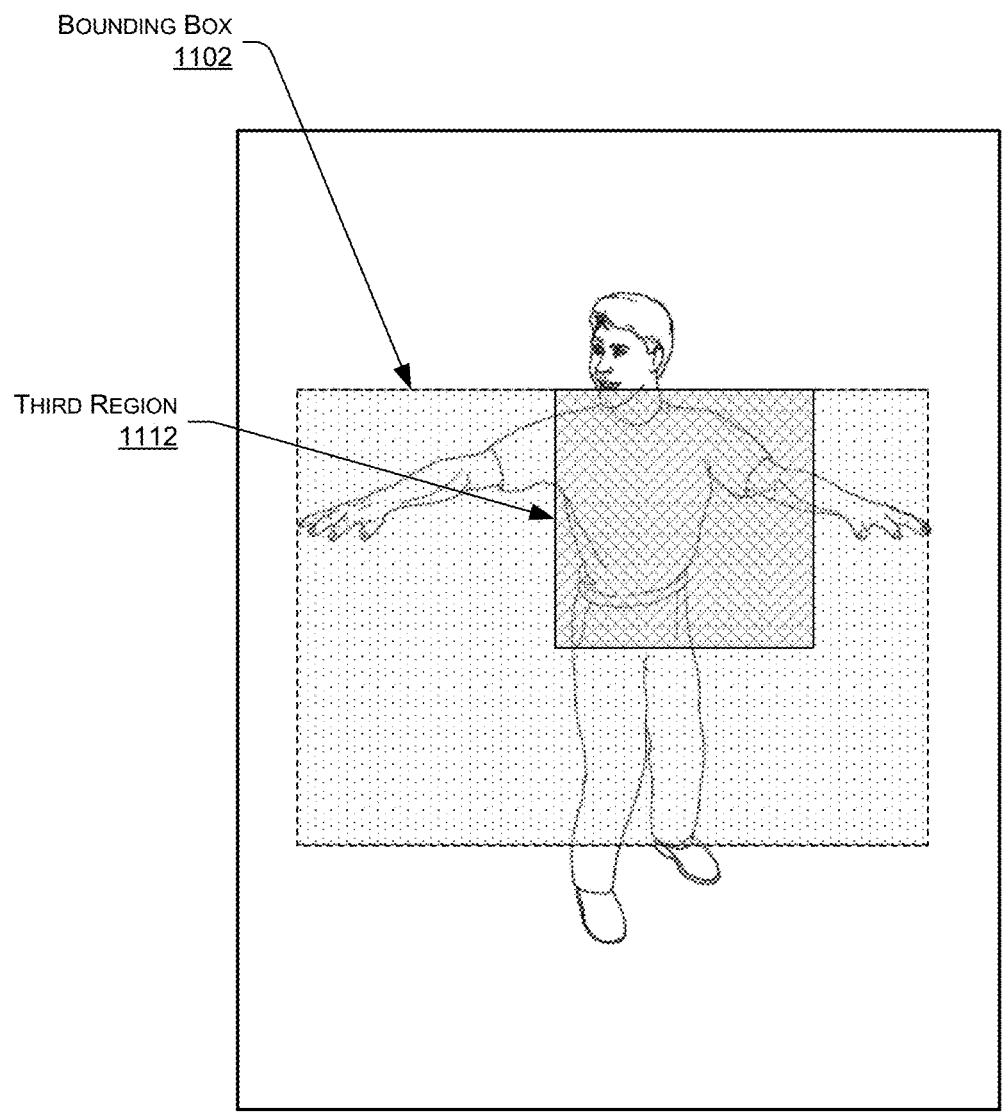

FIG. 11C illustrates that the techniques may continue analyzing regions of the image 302 after analyzing the first region 1108. Here, for instance, the techniques analyze a second region 1110, which again has a size corresponding to the ROI size. Furthermore, in some instances one or more searched regions may overlap (e.g., by 5%, 25%, 50%, etc.). In this example, the first region 1108 and the second region 1110 overlap by approximately 50%. FIG. 11D, meanwhile, illustrates yet another region, a third region 1112, that is analyzed to determine whether it depicts the item 1104. In some instances, the techniques may continue to "move around" the region being searched until each space within the bounding box 1102 has been searched. That is, the techniques may effectively "slide" a box having the ROI size 1106 around the bounding box 1102 to determine whether the image 302 illustrates the item 1104. Further, and as discussed above, the techniques may determine a degree of similarity between the item 1104 and the image 302 (based on the region comparisons) such that images may later be ranked according to similarity to the item 1104.

Figure 12A:
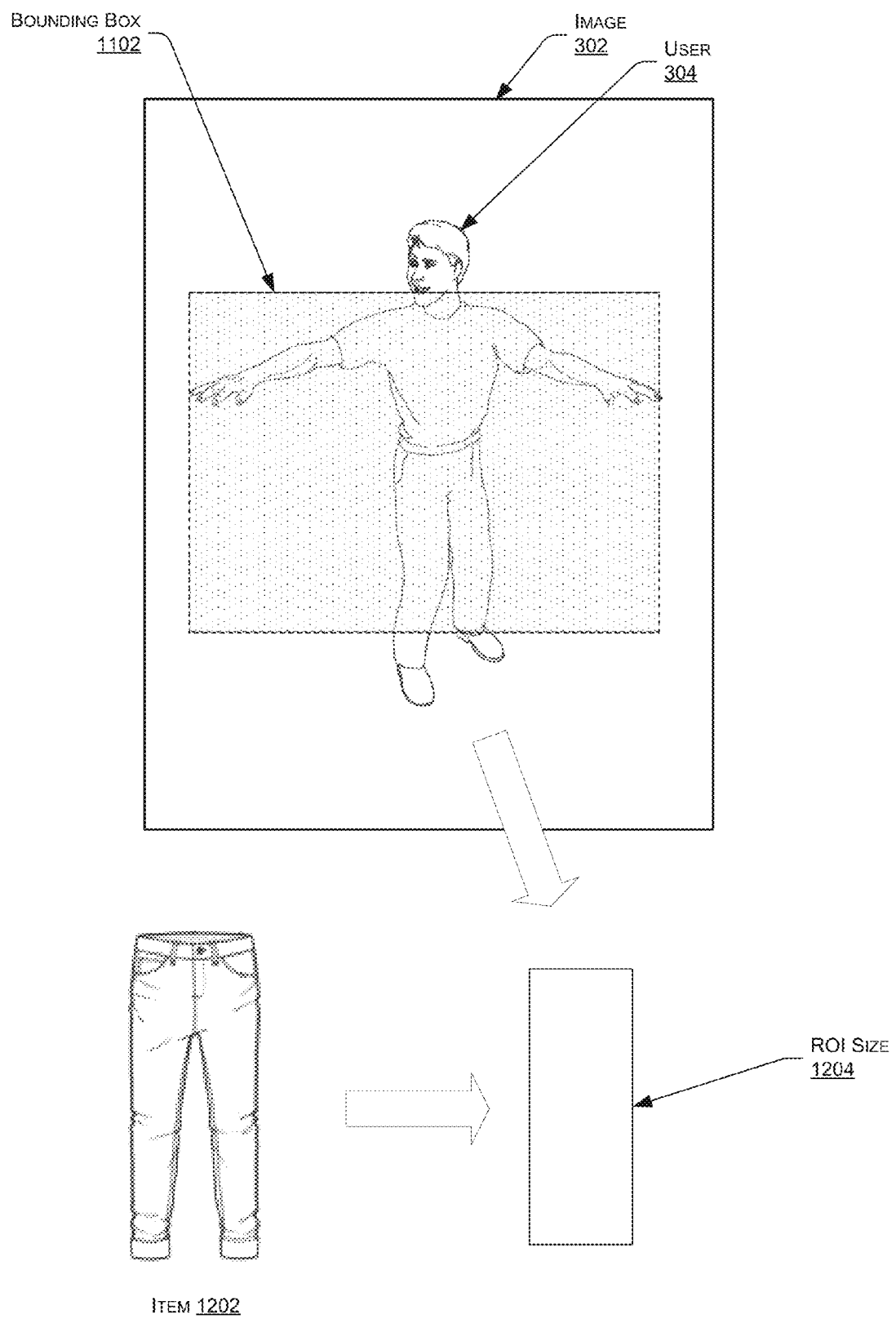
FIGS. 12A-D collectively illustrate another example of calculating an ROI size for an image. Taken together.

FIGS. 12A-D collectively illustrate another example of calculating an ROI size for the example image 302. Taken together, FIGS. 11 and 12 illustrate that the ROI size may change based on the item being searched for (e.g., a T-shirt versus jeans). FIG. 12A, for instance, illustrates that a request has now been issued to identify one or more images that depict another item 1202, a pair of jeans. Similar to the above, the techniques may determine an ROI size 1204 based on the size of the jeans, the depth of the jeans within the reference image, and a depth of the user (or other object, such as a clothes rack, mannequin, etc.) within the image 302. In this instance, the ROI size 1106 has a more elongated shape, as one would expect, given that the item now comprises jeans rather than a T-shirt.

Figure 12B:
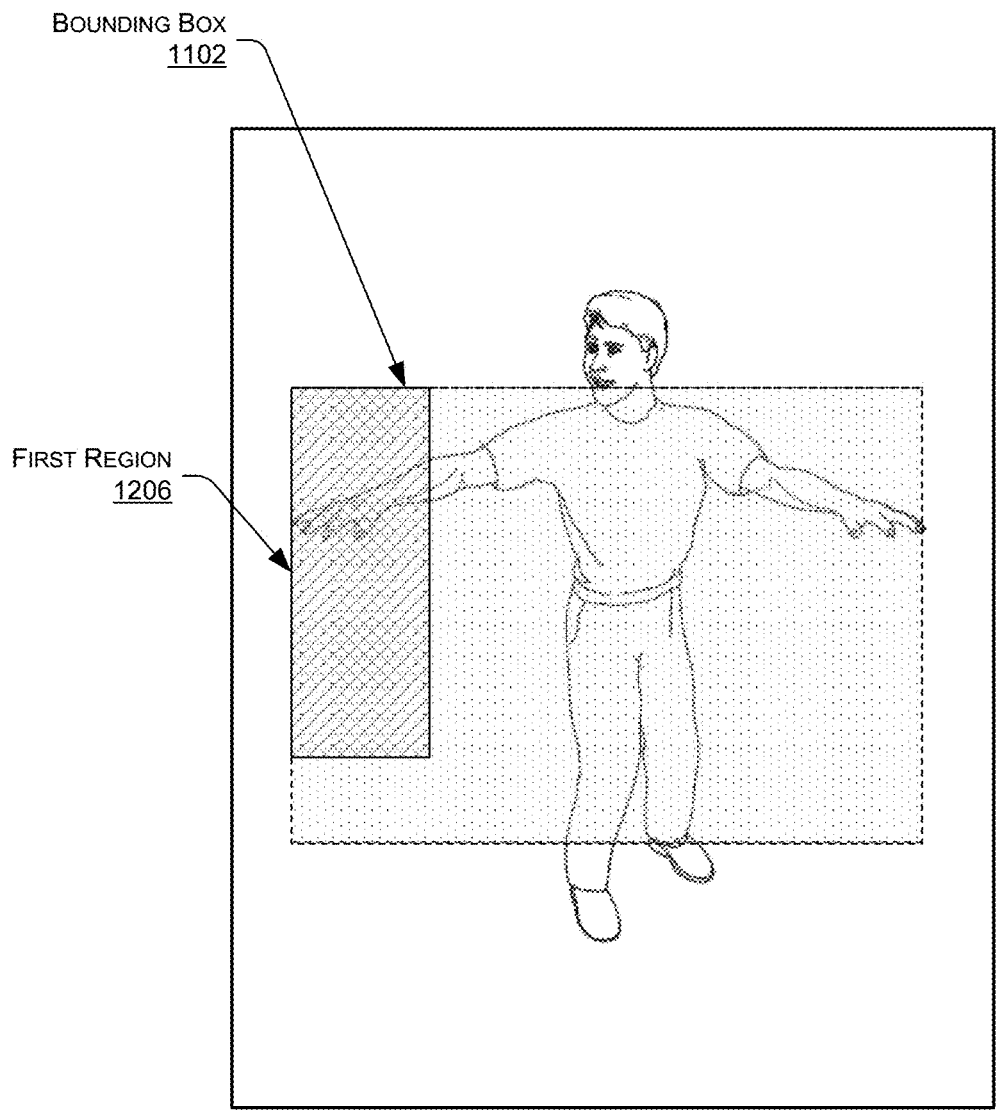
Figure 12C:
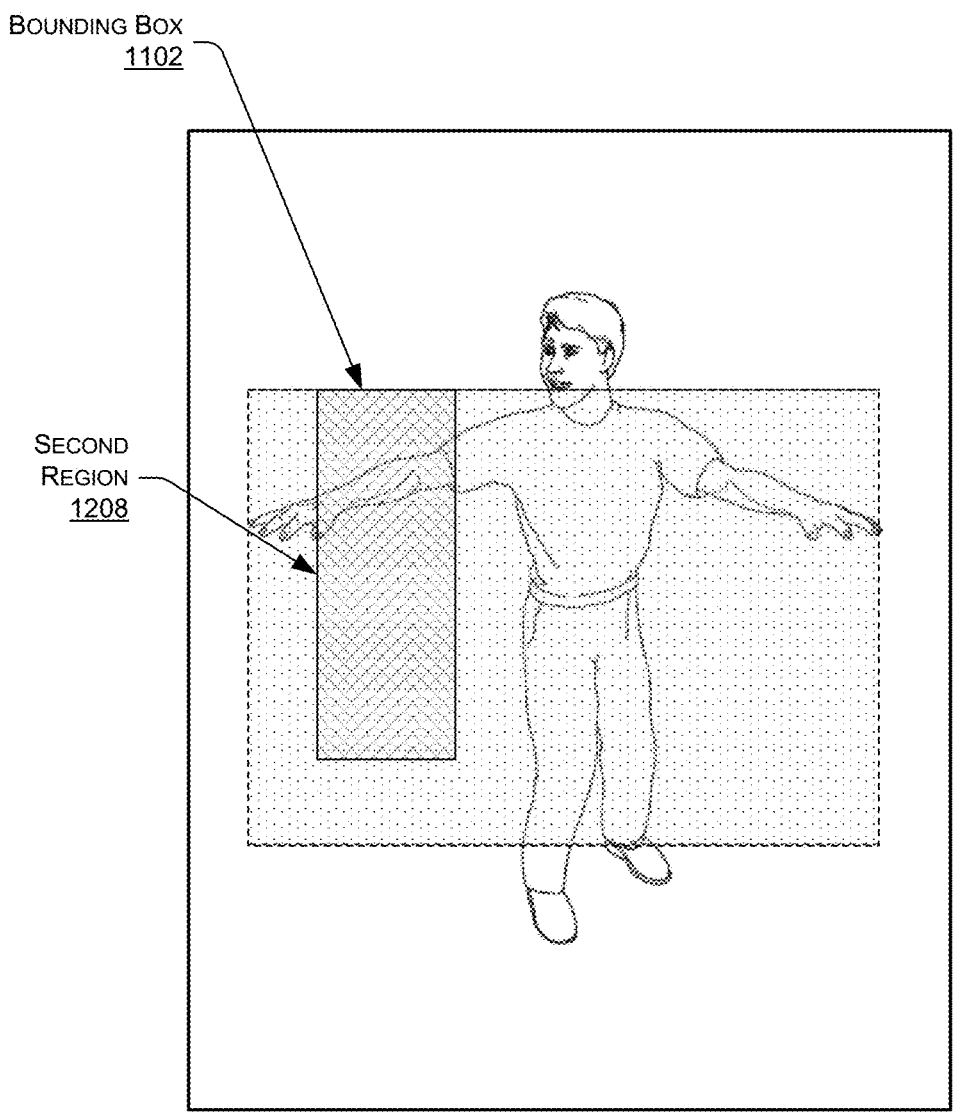
Figure 12D:
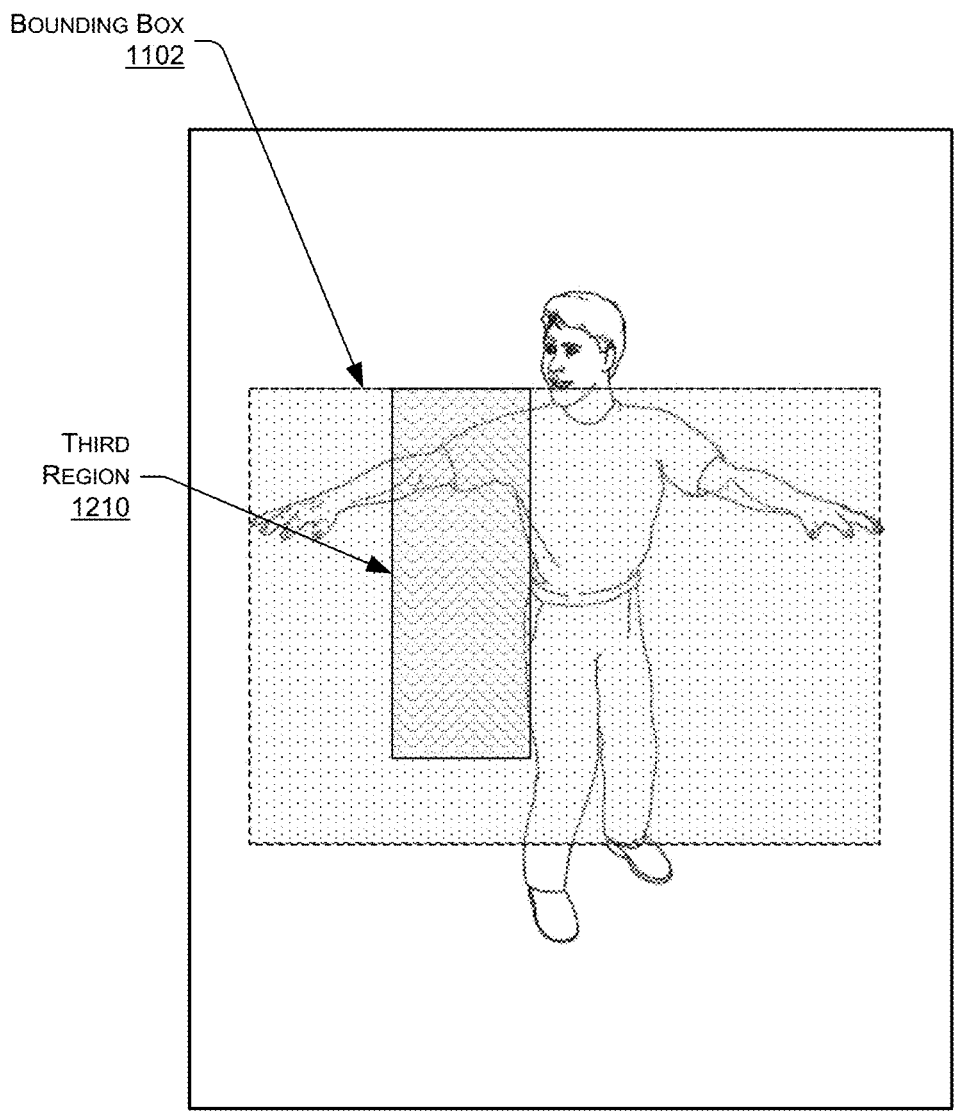

FIG. 12B illustrates that the techniques may compare features of the item 1202 to a first region 1206, with the first region having a size and shape corresponding to the ROI size 1204. FIG. 12C, meanwhile, illustrates comparing features of the item 1202 to a second region 1208, with the second region having a size and shape corresponding to the ROI size 1204. Finally, FIG. 12D illustrates comparing features of the item 1202 to a third region 1210, with the third region having a size and shape corresponding to the ROI size 1204. As in FIGS. 11B-D above, the techniques may, but need not, compare regions that overlap one another, and may search within regions that collectively cover all or a predefined threshold amount of the bounding box 1102.

Figure 13A:
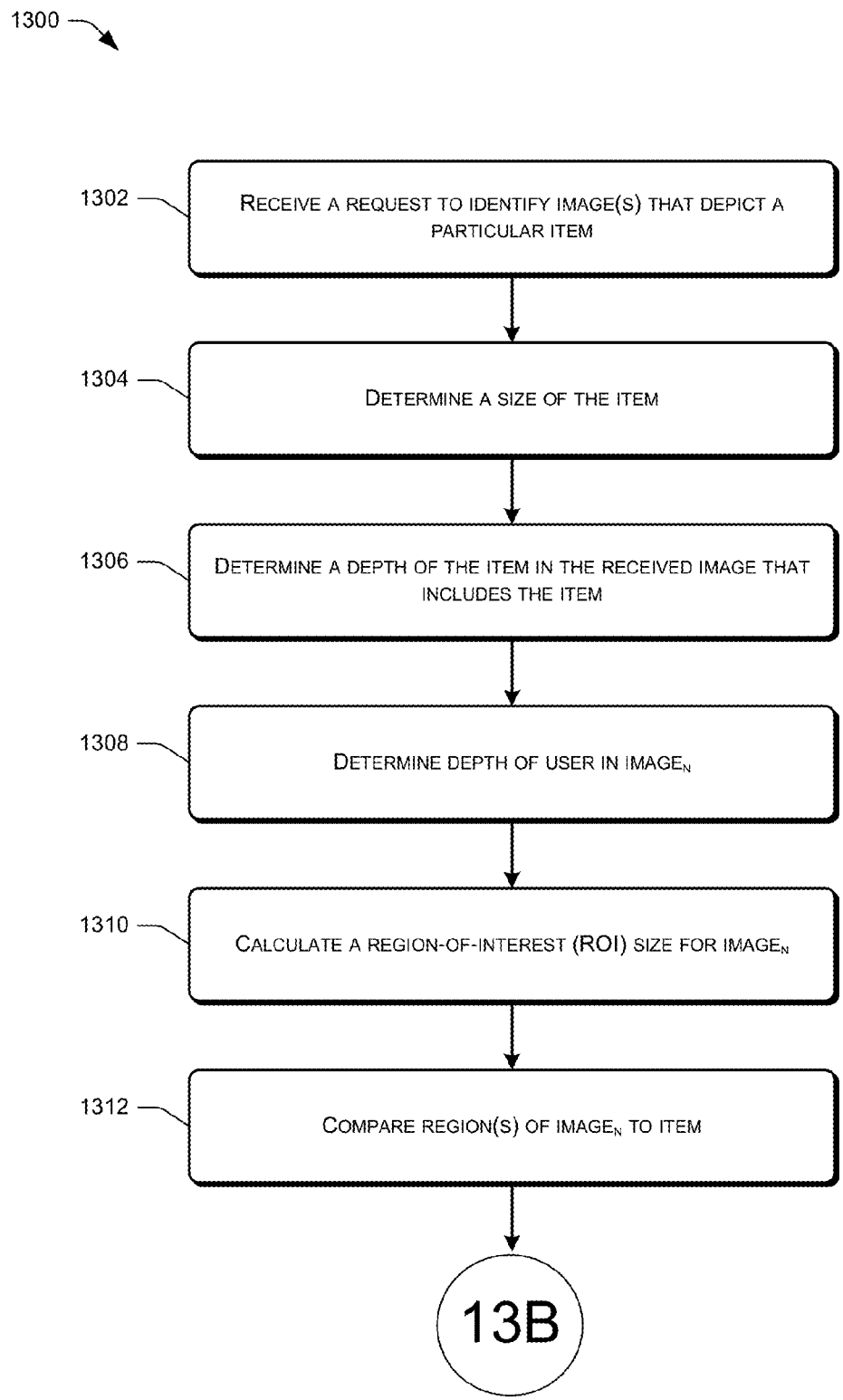
FIGS. 13A-B collectively illustrate a flow diagram of an example process for receiving a request to identify images that depict a particular item, determining an ROI size, and comparing features of the item to regions of images having the corresponding ROI sizes.
Figure 13B:
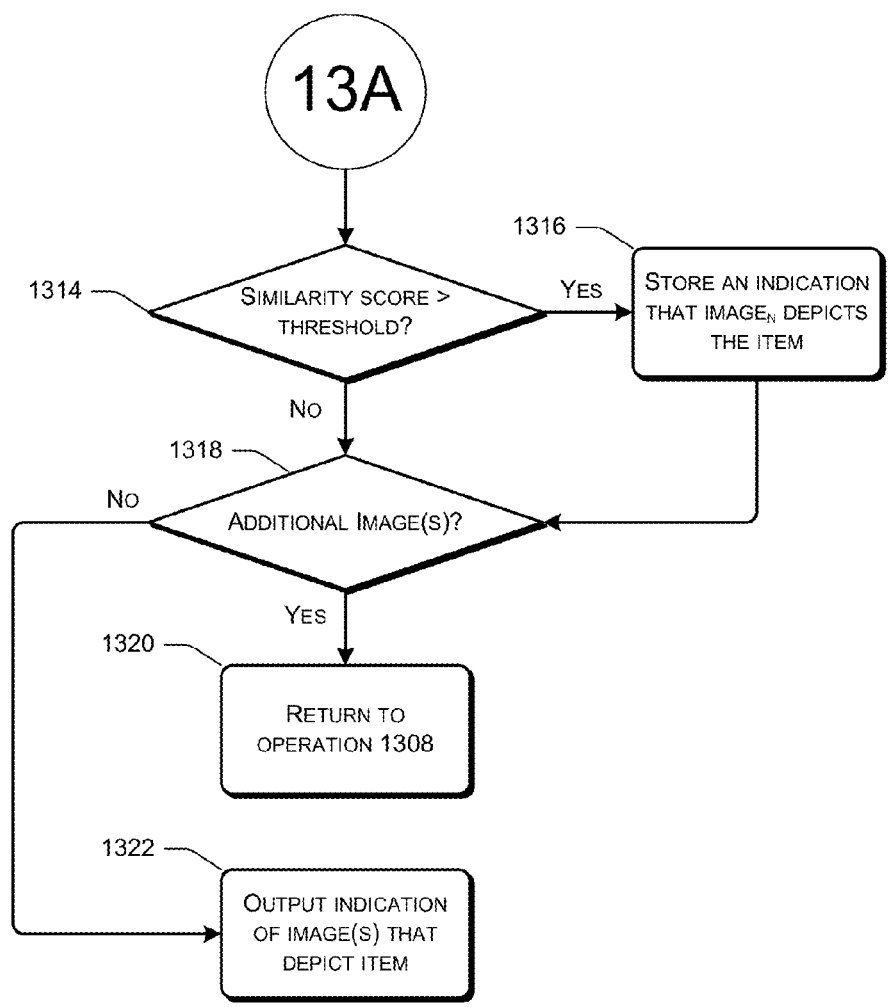

FIGS. 13A-B collectively illustrate a flow diagram of an example process 1300 for receiving a request to identify images that depict a particular item, determining an ROI size, and comparing features of the item to regions of images having the corresponding ROI sizes. At 1302, the process 1300 receives a request to identify images that depict a particular item, as discussed above. At 1304, the process 1300 determines a size of the item. For instance, the process 1300 may determine a size of the item within image data corresponding to a reference image depicting the item, such as an image provided by a user when making the request to identify images that depict the item. The size of the item may represent a dimensions of a rectangle or other shape that encapsulates some or all of the item, a number of pixels within a surface area of the item in the image, or the like.

At 1306, the process 1300 determines a depth of the item in the reference image data. For instance, the process 1300 may utilize a provided depth map to approximate a depth of the item in the reference image data. At 1308, the process 1300 determines a depth of a user in a first image data (imagers), potentially using a depth map corresponding to the image being searched. That is, the process 1300 may approximate a depth of the user by averaging depth values associated with pixels corresponding to the user illustrated within the image data. Further, while FIGS. 13A-B describe performing the process 1300 with respect to a user, in some instances the process 1300 may operate upon any other object within images (e.g., mannequins, clothes racks, etc.).

At 1310, the process 1300 calculates an ROI size for the image$_n$. For instance, the process 1300 may determine the ROI size for this image as a function of a product a size of the item within the reference image data and a ratio of the depth of item in the reference image to the depth of the user in the image being searched. At 1312, the process 1300 compares one or more regions of the image data to the item. As described above, this may include applying a color-histogram filter to the regions (having the calculated ROI size) to identify regions that generally match a color of the item and then applying a trained classifier to those regions.

FIG. 13B continues the illustration and includes, at 1314, determining whether a similarity score for each region is greater than a similarity threshold. If a similarity score for a particular region is greater than the threshold, then at 1316 the process 1300 stores an indication that the image depicts the item. In addition, the process 1300 may store an indication of the similarity score for each region, which may be used to rank images against one another in terms of how closely they match the item.

After performing the determination at 1314 for one or more regions of the first image data, the process 1300 determines, at 1318, whether image data corresponding to one or more images exist for searching upon. If so, then at 1320 the process 1300 returns to the calculating of a new ROI size for a new image at 1308. After each image has been searched, or after some other trigger has been reached (e.g., identifying ten images that depict the item), then the process 1300 proceeds to 1322, at which point the process 1300 outputs an indication of one or more images that depict the item. As described above, in some instances this indication lists the images in descending order based on their respective similarity scores.

Figure 14:
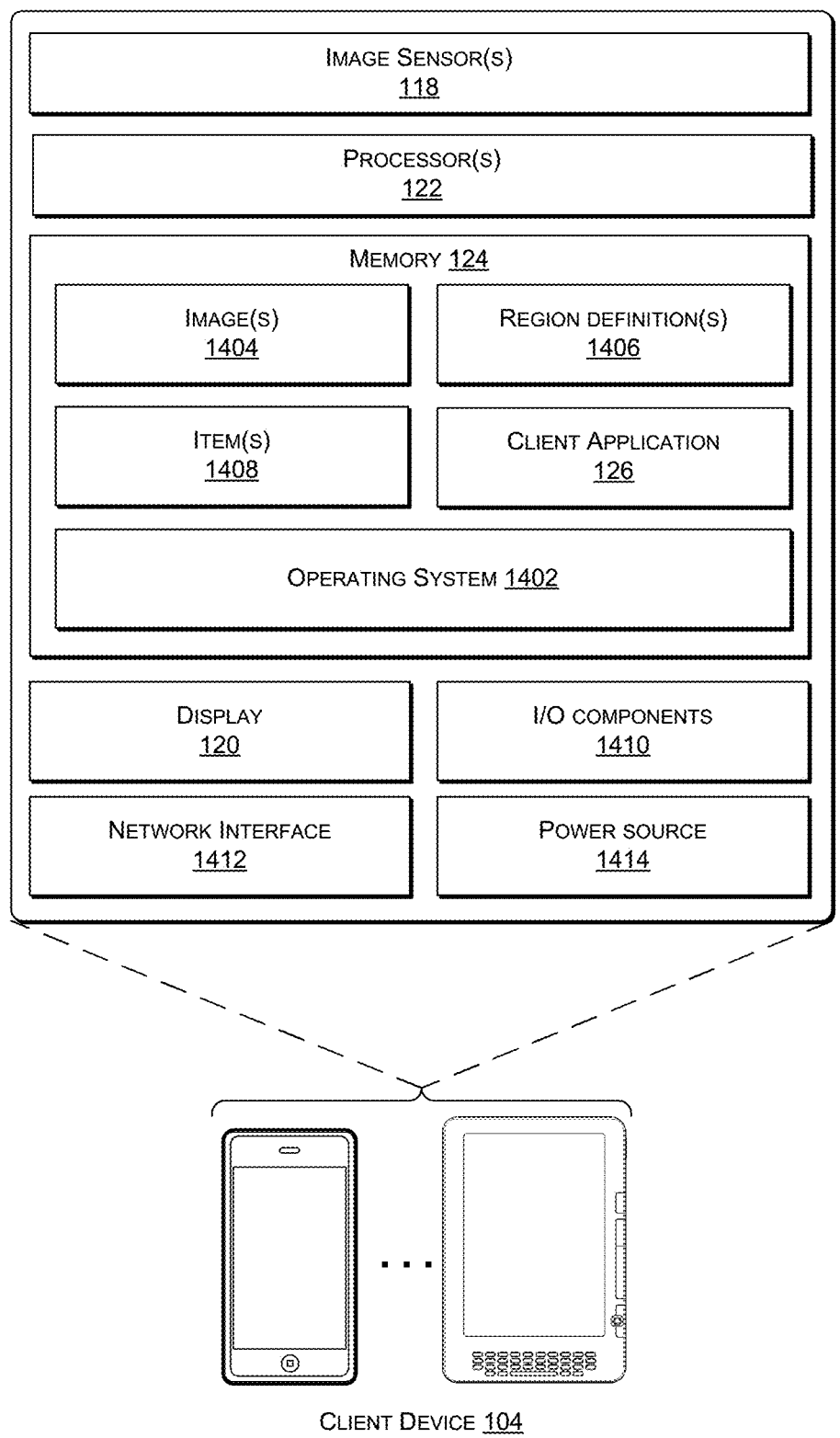
FIG. 14 illustrates an example client device that may used to implement the techniques described herein.

FIG. 14 illustrates the example client device 104 includes features for implementing the techniques described herein. The device 104 may be implemented as a mobile telephone, a tablet computing device, an electronic book reader, a laptop computer, a desktop computer, and/or the like. As illustrated, the electronic device 104 may include the one or more image sensors 118, the one or more processors 122, the memory 124, the one or more displays 120, one or more I/O components 1410 for interacting with the device, one or more network interfaces 1412, and one or more power sources 1414. The network interfaces 1412 may support both wired and wireless connection to various networks, such as cellular networks, radio, WiFi networks, short range networks (e.g., Bluetooth®), infrared (IR), and so forth.

Depending on the configuration of the electronic device 104, the memory 124 (and other memory described throughout) is an example of computer storage media and may include volatile and nonvolatile memory. Thus, the memory 124 may include, but is not limited to, RAM, ROM, EEPROM, flash memory, or other memory technology, or any other medium that can be used to store computer-readable instructions, programs, applications, media items, and/or data which can be accessed by the electronic device 104. In some examples, the computer-readable media is a tangible non-transitory computer-readable media.

The memory 124 may be used to store any number of functional components that are executable on the processors 122, as well as content items that are rendered by the electronic device 104. The memory 124 may also store the client application 126 for interacting with the image-recognition service 108 and, potentially, for performing some or all of the operations discussed above with reference to the image-recognition service 108, as discussed above. As such, the memory 124 may store images 1404 captured by one or more users, region definitions 1406 defining different regions within the images 1404, and one or more items 1408 indicated as being associated with the user (e.g., an indication of clothing items of the user). The memory 124 may also include an operating system 1402 and one or more content presentation engines to present content items, such as electronic books, on the device 104. These content presentation engines may be implemented as various applications depending upon the content items. For instance, the content presentation engine may be an electronic book reader application for rendering textual electronic books, an audio player for playing audio books or songs, a video player for playing video, and so forth.

While FIG. 14 illustrates a few example components, the electronic device 104 may have additional features or functionality. For example, the device 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 104 may reside remotely from the device 104 in some implementations.

In some instances, the client device 104 includes some or all of the functionality described above with respect to the image-recognition service 108. For instance, the client device 104 may include the image-recognition module 138 and/or the region-definition module 140. Furthermore, in some instances a combination of a client devices may implement some or all of the techniques described herein. For instance, a first client device comprise an array of one or more cameras (e.g., an RGB camera and a depth sensor) hanging a wall or mirror, self-standing, or the like and may communicate with a second client device (e.g., a mobile phone, tablet computing device, etc.) executing a companion application. The first client device (which may be display-less) and/or the second client device may perform some or all of the techniques described above, such as defining the regions, identifying items therein, and the like. Additionally or alternatively, the first and second devices may communicate with the image-recognition service 108, as described above.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:

storing first image data that depicts a user wearing at least a first top item of clothing and a first bottom item of clothing;

defining a first region of the first image data, the first region of the first image data substantially corresponding to pixel data that represents a torso of the user and pixel data that represents legs of the user;

defining a second region of the first image data, the second region of the first image data substantially corresponding to at least a portion of the pixel data that represents the torso of the user;

defining a third region of the first image data, the third region of the first image data substantially corresponding to at least a portion of the pixel data that represents the legs of the user;

storing second image data that depicts the user wearing a second top item of clothing and a second bottom item of clothing;

defining a first region of the second image data, the first region of the second image data substantially corresponding to pixel data that represents the torso of the user and pixel data that represents the legs of the user;

defining a second region of the second image data, the second region of the second image substantially corresponding to at least a portion of the pixel data that represents the torso of the user;

defining a third region of the second image data, the third region of the second image data substantially corresponding to at least a portion of the pixel data that represents the legs of the user;

receiving a request to identify at least one image that depicts an object represented in third image data, the object comprising the first top item of clothing;

analyzing features of the object represented in the third image data with respect to: (i) features of the first region of the first image data; (ii) features of the second region of the first image data, (iii) features of the third region of the first image data; (iv) features of the first region of the second image data; (v) features of the second region of the second image data, and (vi) features of the third region of the second image data;

determining the first region of the first image data depicts the object; and outputting an indication that the first image data depicts the object depicted in the third image.

2. The method as recited in claim 1, wherein:

the first image data comprises background pixels and non-background pixels; and defining the first region of the first image data comprises:

identifying a smallest rectangular area of the first image data that does not exclude a pixel of the non-background pixels; and designating, as the first region of the first image data, the smallest rectangular area less a top portion of the smallest rectangular area and a bottom portion of the smallest rectangular area.

3. The method as recited in claim 1, wherein:

the first image data comprises background pixels and non-background pixels; and defining the second region of the first image data comprises:

approximating a waist line of the user in the first image data;

identifying a left outermost vertical line, between the waist line and a top boundary of the first region of the first image data, that includes a non-background pixel;

identifying a right outermost vertical line, between the waist line and the top boundary of the first region of the first image data, that includes a non-background pixel; and defining, as the second region of the first image data, a rectangular area of the first image data having a top boundary corresponding to the top boundary of the first region, a bottom boundary corresponding to the waist line, a left boundary corresponding to the left outermost line, and a right boundary corresponding to the right outermost line.

4. The method as recited in claim 1, wherein:

the first image data comprises background pixels and non-background pixels; and defining the third region of the first image data comprises:

approximating a waist line of the user in the first image;

identifying a left outermost vertical line, between the waist line and a bottom boundary of the first region of the first image data, that includes a non-background pixel;

identifying a right outermost vertical line, between the waist line and the bottom boundary of the first region of the first image data, that includes a non-background pixel; and defining, as the third region of the first image data, a rectangular area of the first image having a top boundary corresponding to the waist line, a bottom boundary corresponding to the bottom boundary of the first region, a left boundary corresponding to the left outermost line, and a right boundary corresponding to the right outermost line.

5. The method as recited in claim 1, further comprising:

defining a fourth region of the first image data, the fourth region of the first image data substantially corresponding to pixel data that represents a center portion of the torso of the user;

defining a fifth region of the first image data, the fifth region of the first image data substantially corresponding to pixel data that represents outside portions of the torso excluding the center portion of the torso;

defining a fourth region of the second image data, the fourth region of the second image data substantially corresponding to at least a portion of the pixel data that represents the center portion of the torso of the user; and defining a fifth region of the second image data, the fifth region of the second image data substantially corresponding to at least a portion of the pixel data that represents the outside portions of the torso excluding the pixel data that represents the center portion of the torso;

and wherein the analyzing further comprises analyzing the object represented in the third image data with respect to: (i) the fourth region of the first image data; (ii) the fifth region of the first image data; (iii) the fourth region of the second image data; and (iv) the fifth region of the second image data.

6. A method comprising:

receiving first image data from a client device, the first image data depicting a particular item;

receiving a request to identify additional image data that depicts the particular item;

analyzing pixel data from the first image data corresponding to the particular item relative to pixel data corresponding to a first region of second image data using a pre-trained classifier, the first region substantially corresponding to pixel data that represents a torso of a user depicted in the second image data;

analyzing the pixel data from the first image data corresponding to the particular item relative to pixel data corresponding to a second region of the second image data using the pre-trained classifier, the second region substantially corresponding to pixel data that represents legs of the user depicted in the second image data;

determining the first region depicts the particular item; and outputting an indication that the second image data depicts the particular item.

7. The method as recited in claim 6, wherein
the pre-trained classifier comprises a pre-trained convolutional neural network.

8. The method as recited in claim 6, wherein the second image data comprises background pixels and non-background pixels, and further comprising:
identifying a top boundary of the first region;
approximating a waist line of the user in the second image data;
identifying a left outermost vertical line, between the waist line and the top boundary, that includes a non-background pixel;
identifying a right outermost vertical line, between the waist line and the top boundary, that includes a non-background pixel; and
defining, as the first region of the first image data, a rectangular area corresponding to the top boundary, the waist line, the left outermost line, and the right outermost line.

9. The method as recited in claim 6, wherein the second image data comprises background pixels and non-background pixels, and further comprising:
identifying a bottom boundary of the second region;
approximating a waist line of the user in the second image data;
identifying a left outermost vertical line, between the waist line and the bottom boundary, that includes a non-background pixel;
identifying a right outermost vertical line, between the waist line and the bottom boundary, that includes a non-background pixel; and
defining, as the second region of the first image data, a rectangular area corresponding to the bottom boundary, the waist line, the left outermost line, and the right outermost line.

10. The method as recited in claim 6, further comprising analyzing the pixel data corresponding to the particular item relative to a third region of the second image data, the third region substantially corresponding to at least a portion of the pixel data that represents the torso of the user and at least a portion of the pixel data that represents the legs of the user.

11. The method as recited in claim 10, wherein the second image data comprises background pixels and non-background pixels, and further comprising:
identifying a smallest rectangular area of the first image data that does not exclude a threshold number of the non-background pixels; and
defining, as the third region of the first image data, the smallest rectangular area less a top portion of the smallest rectangular area and a bottom portion of the smallest rectangular area.

12. The method as recited in claim 6, further comprising analyzing the pixel data corresponding to the particular item relative to a third region of the second image data, the third region substantially corresponding to pixel data that represents a center portion of the torso of the user.

13. The method as recited in claim 6, further comprising analyzing the pixel data corresponding to the particular item relative to a third region of the second image data, the third region substantially corresponding to pixel data that represents outside portions of the torso of the user excluding a center portion of the torso of the user.

14. One or more computing devices comprising:
one or more processors; and
one or more computer-readable media storing computer-executable instructions that, when executed, cause the one or more processors to perform acts comprising:
receiving, from a client device, an indication of a selection of a representation of a particular item presented on a graphical user interface (GUI) of the client device;
receiving a request to identify at least one image that depicts the particular item;
analyzing pixel data corresponding to the particular item relative to pixel data corresponding to a first region of first image data using a pre-trained classifier, the first region substantially corresponding to at pixel data that represents a torso of a user depicted in the first image data;
analyzing the pixel data corresponding to the particular item relative to pixel data corresponding to a second region of the first image data using the pre-trained classifier, the second region substantially corresponding to pixel data that represents legs of the user depicted in the first image data;
determining that at least one of the first region or the second region depicts the particular item; and
outputting an indication that the first image data depicts the particular item.

15. The one or more computing devices as recited in claim 14, wherein
the pre-trained classifier comprises a pre-trained convolutional neural network.

16. The one or more computing devices as recited in claim 14, wherein the first image data comprises background pixels and non-background pixels, and the acts further comprising:
identifying a top boundary of the first region;
approximating a waist line of the user in the first image data;
identifying a left outermost vertical line, between the waist line and the top boundary, that includes a non-background pixel;
identifying a right outermost vertical line, between the waist line and the top boundary, that includes a non-background pixel; and
defining, as the first region of the first image data, a rectangular area corresponding to the top boundary, the waist line, the left outermost line, and the right outermost line.

17. The one or more computing devices as recited in claim 14, wherein the first image data comprises background pixels and non-background pixels, and the acts further comprising:
identifying a bottom boundary of the second region;
approximating a waist line of the user in the first image data;
identifying a left outermost vertical line, between the waist line and the bottom boundary, that includes a non-background pixel;
identifying a right outermost vertical line, between the waist line and the bottom boundary, that includes a non-background pixel; and
defining, as the second region of the first image data, a rectangular area corresponding to the bottom boundary, the waist line, the left outermost line, and the right outermost line.

18. The one or more computing devices as recited in claim 14, the acts further comprising analyzing the pixel data corresponding to the particular item relative to a third region of the first image data, the third region substantially corresponding to at least a portion of the pixel data that represents the torso of the user and at least a portion of the pixel data that represents the legs of the user.

19. The one or more computing devices as recited in claim 18, wherein the first image data comprises background pixels and non-background pixels, and the acts further comprising:
   identifying a smallest rectangular area of the first image data that does not exclude a threshold number of the non-background pixels; and
   defining, as the third region of the first image data, the smallest rectangular area less a top portion of the smallest rectangular area and a bottom portion of the smallest rectangular area.

20. The one or more computing devices as recited in claim 14, the acts further comprising analyzing the pixel data corresponding to the particular item relative to a third region of the first image data, the third region substantially corresponding to: (i) a center portion of at least a portion of the pixel data that represents the torso of the user, or (ii) outside portions of at least a portion of the pixel data that represents the torso of the user excluding the center portion of the torso of the user.

* * * * *